US012667870B2

(12) United States Patent　　(10) Patent No.:　US 12,667,870 B2
　　Galvan et al.　　　　　　　　(45) Date of Patent:　Jun. 30, 2026

(54) FULL-FLOW SANITARY VALVE

(71) Applicants:Flowtrend, Inc., Houston, TX (US);
**Process Innovation—Food Safety,
LLC**, Lodi, WI (US)

(72) Inventors: Jose Galvan, Houston, TX (US); **Sunil
Samuel, Houston, TX (US); Barry
Plante, Houston, TX (US); Gabe
Miller**, Lodi, WI (US)

(73) Assignees: Flowtrend, Inc., Houston, TX (US);
**Process Innovation—Food Safety,
LLC**, Lodi, WI (US)

( * ) Notice: Subject to any disclaimer, the term of this
patent is extended or adjusted under 35
U.S.C. 154(b) by 282 days.

(21) Appl. No.: 17/061,931

(22) Filed: Oct. 2, 2020

(65)　　　　Prior Publication Data

US 2021/0101188 A1　　Apr. 8, 2021

Related U.S. Application Data

(60) Provisional application No. 62/909,881, filed on Oct.
3, 2019.

(51) Int. Cl.
F16K 5/02　　　　(2006.01)
B08B 9/032　　　(2006.01)
(Continued)

(52) U.S. Cl.
CPC ............ B08B 9/0322 (2013.01); F16K 5/045
(2013.01); F16K 27/065 (2013.01);
(Continued)

(58) Field of Classification Search
CPC ......... B08B 9/0322; B08B 9/00; F16K 5/045;
F16K 27/065; F16K 27/06; F16K 27/062;
(Continued)

(56)　　　　References Cited

U.S. PATENT DOCUMENTS 178,724　A　*　6/1876　Brower ................. F16K 11/083
　　　　　　　　　　　　　　　　　137/625.42
208,808　A　*　10/1878　Glenn ................... F16K 11/087
　　　　　　　　　　　　　　　　　137/625.41
(Continued)

FOREIGN PATENT DOCUMENTS

CN　　　209164639 U　　7/2019
EP　　　　3470352 A1　10/2018
(Continued)

OTHER PUBLICATIONS

European Patent Office, Extended European Search Report for EP
Appl. No. 20871477.4 dated Sep. 14, 2023, 8 pp.

*Primary Examiner* — Craig J Price
(74) *Attorney, Agent, or Firm* — Edwin S. Flores; Daniel
J. Chalker; Chalker Flores, LLP

(57)　　　　ABSTRACT
A sanitary valve including a body including at least two
body openings; a plug disposed within the body, rotatable
around a vertical axis, moveable along the vertical axis
within the body, and including a plug top surface and at least
two plug openings; a stem including a first stem end attached
to the top plug surface and a second stem end; and an
actuator attached to the second stem end and operable to
rotate the stem and the plug around the vertical axis and to
move the stem and the plug along the vertical axis.

18 Claims, 28 Drawing Sheets

(51) Int. Cl.
    *F16K 5/04*       (2006.01)
    *F16K 27/06*     (2006.01)
    *F16K 11/083*    (2006.01)

(52) U.S. Cl.
    CPC ........... *F16K 5/0207* (2013.01); *F16K 11/083*
             (2013.01); *F16K 27/062* (2013.01)

(58) Field of Classification Search
    CPC .... F16K 11/08; F16K 11/083; F16K 11/0833;
            F16K 11/0836; F16K 5/0207; F16K 5/02;
            F16K 5/0242; F16K 5/04; F16K 1/446;
            F16K 3/36; F16K 5/222; F16K 5/22;
            F16K 5/225; F16K 5/0414; F16K 5/162;
            F16K 5/0214; Y10T 137/86871; Y10T
            137/86863; Y10T 137/86823; Y10T
            137/86638; Y10T 137/86566; Y10T
            137/4238–4449; Y10T 137/87362; Y10T
            137/8737; Y10T 137/0402–043
    USPC ........... 137/625.47, 625.41, 625.46, 625.21,
            137/625.19, 15.01–15.6, 237–246.23,
            137/599.14, 599.15, 246.11, 246.13,
            137/246.14, 246.18, 246.19, 246.21,
          137/246.2, 246–246.23; 134/81, 91, 96.1,
            134/98.1; 251/310, 311, 171, 317,
            251/366–368, 355, 304, 286, 283,
            251/176–192; 184/38.1, 70
    See application file for complete search history.

(56)          References Cited

U.S. PATENT DOCUMENTS

| | | | | | |
|---|---|---|---|---|---|
| 264,525 | A * | 9/1882 | Glenn | F16K 47/045 | 251/283 |
| 385,653 | A * | 7/1888 | Wright | B05B 1/262 | 239/455 |
| 417,702 | A * | 12/1889 | Carroll et al. | F16K 5/184 | 137/7 |
| 464,429 | A * | 12/1891 | Dart | F16K 5/02 | 137/246.23 |
| 477,605 | A * | 6/1892 | Rufus | F16K 27/065 | 251/317.01 |
| 478,618 | A * | 7/1892 | Logan | F16K 5/02 | 137/246.23 |
| 488,401 | A * | 12/1892 | Owells | F16K 5/162 | 251/310 |
| 614,594 | A * | 11/1898 | Williamson | B01D 24/24 | 137/625.22 |
| 616,827 | A * | 12/1898 | Deisher | B61D 27/0036 | 237/40 |
| 688,298 | A * | 12/1901 | Foss | F16K 5/162 | 251/310 |
| 1,060,791 | A * | 5/1913 | Schaller | F16K 11/0853 | 251/310 |
| 1,069,156 | A * | 8/1913 | Martin | F16K 5/222 | 137/246.15 |
| 1,103,439 | A | 7/1914 | Schultz | | |
| 1,141,565 | A * | 6/1915 | Lenning | F16K 5/02 | 137/625.37 |
| 1,358,968 | A * | 11/1920 | Mattern | F22B 37/545 | 137/240 |
| 1,440,083 | A * | 12/1922 | Jacobsen | F16K 5/222 | 137/246.19 |
| 1,516,029 | A * | 11/1924 | Sturtevant | B28C 5/0806 | 137/555 |
| 1,526,995 | A * | 2/1925 | Mcginley | F16K 11/083 | 137/625.16 |
| 1,570,637 | A * | 1/1926 | Nordstrom | F16K 5/222 | 137/246.19 |
| 1,571,150 | A * | 1/1926 | Trinks | F16K 5/222 | 137/246.22 |
| 1,589,178 | A * | 6/1926 | Kenyon | F16K 11/083 | 137/625.16 |
| 1,634,722 | A * | 7/1927 | Nordstrom | F16K 5/222 | 137/246.15 |
| RE17,101 | E * | 10/1928 | Nordstrom | F16K 5/222 | 137/246.15 |
| 1,696,723 | A * | 12/1928 | Milliken | F16K 5/222 | 251/286 |
| 1,696,726 | A * | 12/1928 | Nordstrom | F16K 5/222 | 137/246.22 |
| RE17,337 | E * | 6/1929 | Milliken | F16K 5/22 | 137/246.16 |
| RE17,375 | E * | 7/1929 | Nordstrom | F16K 5/222 | 137/246.15 |
| 1,734,074 | A * | 11/1929 | Carner | F16K 5/222 | 251/192 |
| 1,777,608 | A | 10/1930 | Englebright | | |
| 1,791,914 | A * | 2/1931 | Tomlinson | F16K 5/0214 | 251/310 |
| 1,798,498 | A * | 3/1931 | Riley | F16K 5/222 | 251/286 |
| 1,875,302 | A * | 8/1932 | Flodin | F16K 5/222 | 137/246.14 |
| 1,915,068 | A * | 6/1933 | Milliken | F16K 5/22 | 137/246.14 |
| 1,946,745 | A * | 2/1934 | Johnston | F16K 5/0264 | 251/171 |
| 1,964,782 | A * | 7/1934 | Bard | F16K 5/222 | 251/286 |
| 1,982,644 | A * | 12/1934 | De Florez | F16K 11/083 | 137/340 |
| 1,994,618 | A * | 3/1935 | Nordstrom | F16K 5/222 | 184/45.1 |
| 2,001,035 | A * | 5/1935 | Noll | F16K 5/162 | 251/286 |
| 2,012,578 | A * | 8/1935 | Nordstrom | F16K 5/222 | 277/377 |
| 2,023,854 | A * | 12/1935 | Petricone | B08B 9/0323 | 134/169 C |
| 2,026,891 | A * | 1/1936 | Haun | F16K 5/222 | 137/246.14 |
| 2,029,438 | A * | 2/1936 | Nordstrom | F16K 5/222 | 251/335.2 |
| 2,041,669 | A * | 5/1936 | Whittle | F16K 5/222 | 137/246.22 |
| 2,047,752 | A | 7/1936 | Specht | | |
| 2,058,748 | A * | 10/1936 | Wilkins | F16K 5/222 | 137/246.19 |
| 2,060,388 | A * | 11/1936 | Whittle | F16K 5/162 | 251/188 |
| 2,062,031 | A | 11/1936 | Lewis | | |
| 2,062,068 | A * | 11/1936 | Nordstrom | F16K 5/222 | 137/246.18 |
| 2,066,250 | A * | 12/1936 | Clark | F16K 5/162 | 137/246.22 |
| 2,095,064 | A * | 10/1937 | Harper | F16K 5/12 | 251/117 |
| 2,124,359 | A * | 7/1938 | Weisgerber | F16K 5/0207 | 137/271 |
| 2,127,679 | A * | 8/1938 | Dudley | F15B 13/04 | 137/625.23 |
| 2,160,741 | A * | 5/1939 | Jensen | B67D 7/06 | 222/627 |
| 2,168,903 | A * | 8/1939 | Jacobsen | F16K 5/222 | 137/246.19 |
| 2,216,150 | A * | 10/1940 | Wilkins | F16K 5/222 | 137/246.19 |
| 2,244,928 | A * | 6/1941 | Waddell | F16K 5/222 | 137/246.13 |
| 2,250,124 | A * | 7/1941 | Carter | F16K 5/225 | 137/559 |
| 2,296,650 | A * | 9/1942 | Mueller | F16K 5/222 | 137/625.18 |
| 2,307,171 | A | 1/1943 | Tutton | | |
| 2,318,638 | A * | 5/1943 | Scott | F16K 27/062 | 137/240 |

(56)                References Cited

U.S. PATENT DOCUMENTS

| | | | | |
|---|---|---|---|---|
| 2,323,421 A * | 7/1943 | Reed | F16K 5/222 | 137/246.13 |
| 2,368,768 A * | 2/1945 | Mueller | F16K 5/222 | 137/625.18 |
| 2,422,368 A * | 6/1947 | Ray | F23N 5/10 | 137/66 |
| 2,488,283 A * | 11/1949 | Franck | F16K 11/083 | 251/297 |
| 2,495,593 A * | 1/1950 | Mueller | F16K 5/222 | 137/246.2 |
| 2,495,594 A * | 1/1950 | Mueller | F16K 5/222 | 137/246.2 |
| 2,505,138 A * | 4/1950 | O'Donnell | F16K 5/222 | 137/246.15 |
| 2,518,790 A * | 8/1950 | Jacobsen | F16K 5/222 | 137/246.11 |
| 2,552,374 A * | 5/1951 | Mills | F16K 5/222 | 137/246.11 |
| 2,565,609 A * | 8/1951 | Jacobsen | F16K 5/222 | 137/246.11 |
| 2,593,967 A * | 4/1952 | Bostock | F16K 5/222 | 137/246.13 |
| 2,594,611 A * | 4/1952 | Banides | F16K 5/222 | 251/368 |
| 2,596,964 A * | 5/1952 | Waddell | F16K 5/222 | 137/246.16 |
| 2,603,448 A * | 7/1952 | Waddell | F16K 5/222 | 137/246.2 |
| 2,606,737 A * | 8/1952 | Tratzik | F16K 5/222 | 137/246.11 |
| 2,621,886 A * | 12/1952 | Mueller | F16K 11/085 | 251/363 |
| 2,646,960 A * | 7/1953 | Ericson | F16K 5/225 | 251/182 |
| 2,650,610 A * | 9/1953 | Brumbaugh | F16K 5/10 | 137/614.19 |
| 2,650,612 A * | 9/1953 | Brumbaugh | F16K 5/0214 | 137/637.4 |
| 2,650,613 A * | 9/1953 | Brumbaugh | F16K 5/106 | 137/637.4 |
| 2,653,791 A * | 9/1953 | Mueller | F16K 5/0278 | 251/188 |
| 2,658,713 A * | 11/1953 | Scherer | F16K 5/22 | 137/246.18 |
| 2,700,250 A * | 1/1955 | Williams | A63H 3/28 | 446/175 |
| 2,708,096 A * | 5/1955 | Mueller | F16K 5/0278 | 251/309 |
| 2,776,104 A * | 1/1957 | Sinkler | F16K 5/0271 | 29/451 |
| 2,829,668 A * | 4/1958 | Mueller | F16K 5/222 | 137/246.16 |
| 2,872,937 A * | 2/1959 | Housworth | F16K 5/222 | 251/162 |
| 2,898,081 A * | 8/1959 | Johnson | F16K 35/10 | 411/530 |
| 2,945,668 A * | 7/1960 | Staller | F16K 5/222 | 137/246.19 |
| 2,999,510 A * | 9/1961 | Volpin | F16K 5/222 | 137/246.12 |
| 3,035,811 A * | 5/1962 | Hamer | F16K 5/0264 | 251/317 |
| 3,051,190 A * | 8/1962 | Milleville | F16K 5/162 | 251/84 |
| 3,068,902 A * | 12/1962 | Brumbaugh | F16K 5/0214 | 137/637.4 |
| 3,128,987 A * | 4/1964 | O'Connor | F16K 5/0271 | 251/312 |
| 3,160,387 A * | 12/1964 | Windsor | F16K 5/0264 | 251/317 |
| 3,174,212 A * | 3/1965 | Seltsam | F16K 27/062 | 29/890.128 |
| 3,198,015 A * | 8/1965 | Smith | F16K 27/065 | 73/756 |
| 3,206,163 A * | 9/1965 | Freed | F16K 5/0271 | 251/317 |
| 3,235,272 A * | 2/1966 | Smith | F16K 41/125 | 220/327 |
| 3,279,492 A * | 10/1966 | Bell | F16K 5/222 | 137/594 |
| 3,345,032 A * | 10/1967 | Rawstron | F16K 11/0876 | 251/315.1 |
| 3,430,655 A * | 3/1969 | Forney | F16K 11/0836 | 137/625.47 |
| 3,498,317 A * | 3/1970 | Duffey | F16K 5/163 | 251/317 |
| 3,509,903 A * | 5/1970 | Luckenbill | F16K 5/0271 | 137/246.15 |
| 3,700,003 A * | 10/1972 | Smith | F16K 5/0264 | 251/207 |
| 3,703,910 A * | 11/1972 | Smith | F16K 27/062 | 277/377 |
| 3,771,765 A * | 11/1973 | Scapes | F16K 5/0214 | 251/368 |
| 3,809,114 A * | 5/1974 | Mueller | F16K 27/006 | 137/454.6 |
| 4,034,776 A * | 7/1977 | Eshghy | F16K 39/06 | 137/246.22 |
| 4,174,092 A * | 11/1979 | Macleod | F16K 5/222 | 137/246.22 |
| 4,193,580 A * | 3/1980 | Norris | F16K 5/06 | 251/304 |
| 4,281,619 A * | 8/1981 | Frick | B05C 5/0233 | 118/325 |
| 4,305,567 A * | 12/1981 | Lunt | F16K 5/222 | 428/408 |
| 4,365,366 A * | 12/1982 | Ortega | F16K 11/085 | 137/625.25 |
| 4,365,646 A * | 12/1982 | Sandling | F16K 43/00 | 251/293 |
| 4,410,003 A * | 10/1983 | Sandling | F16K 27/062 | 251/312 |
| 4,436,280 A | 3/1984 | Geisow | | |
| 4,522,233 A * | 6/1985 | Mojadad | F16K 11/083 | 137/625.2 |
| 4,572,231 A * | 2/1986 | Katayama | F16K 5/22 | 251/317 |
| 4,617,957 A * | 10/1986 | Sandling | F16K 5/0285 | 137/454.6 |
| 4,619,283 A * | 10/1986 | Schoeneweis | F16K 41/026 | 277/300 |
| 4,765,590 A * | 8/1988 | Hayman | F16K 5/0464 | 251/900 |
| 5,113,895 A | 5/1992 | Le Devehat | | |
| 5,285,809 A * | 2/1994 | Shimoguri | F04B 39/16 | 137/203 |
| 5,381,818 A * | 1/1995 | Nendzig | F16J 15/121 | 137/625.33 |
| 5,402,983 A * | 4/1995 | Bernhardt | F16K 5/0285 | 251/309 |
| 5,779,222 A * | 7/1998 | Hollingworth | F16K 39/06 | 251/283 |
| 5,800,678 A * | 9/1998 | Pitkajarvi | D21F 1/024 | 162/212 |
| 5,810,326 A * | 9/1998 | Miller | F25B 41/20 | 91/459 |
| 6,216,736 B1 * | 4/2001 | Benedetti | B67C 3/001 | 137/312 |
| 6,293,300 B1 * | 9/2001 | Dumke | F16K 1/446 | 137/613 |
| 6,981,521 B2 * | 1/2006 | Joung | F16K 51/02 | 137/375 |
| 7,048,157 B2 * | 5/2006 | Marchadour | G01F 11/021 | 222/413 |
| 7,641,470 B2 * | 1/2010 | Albizuri | F24C 3/047 | 431/18 |
| 7,686,027 B2 | 3/2010 | Welch et al. | | |
| 8,376,191 B2 | 2/2013 | Dabek et al. | | |

(56) References Cited

U.S. PATENT DOCUMENTS

| | | | | |
|---|---|---|---|---|
| 8,545,216 | B2 * | 10/2013 | Deng | F23N 1/007 |
| | | | | 431/278 |
| 8,764,436 | B2 * | 7/2014 | Deng | F23K 5/147 |
| | | | | 431/278 |
| 8,967,199 | B2 | 3/2015 | Blieske et al. | |
| 9,273,796 | B2 | 3/2016 | Jakobsen et al. | |
| 9,533,325 | B2 | 1/2017 | Huth et al. | |
| 9,909,386 | B2 * | 3/2018 | McEvoy | E21B 34/02 |
| 10,018,279 | B2 | 7/2018 | Raimbault et al. | |
| 10,989,319 | B2 * | 4/2021 | Kusumoto | F16K 27/065 |
| 11,174,955 | B2 | 11/2021 | Zinser | |
| 11,440,063 | B2 * | 9/2022 | Zinser | F16K 5/163 |
| 11,480,258 | B2 * | 10/2022 | Ono | F16K 31/041 |
| 11,592,115 | B2 * | 2/2023 | Kostański | F16K 11/0836 |
| 11,732,814 | B2 * | 8/2023 | McPhail | F16K 5/0471 |
| | | | | 251/309 |
| 11,846,358 | B1 * | 12/2023 | Grissom | F16K 5/0464 |
| 11,850,636 | B2 * | 12/2023 | Lovell | F16K 3/246 |
| 11,892,087 | B2 * | 2/2024 | Esaki | F16K 27/065 |

| | | | | |
|---|---|---|---|---|
| 2003/0205282 | A1 * | 11/2003 | Anderson | F16K 11/0876 |
| | | | | 137/625.47 |
| 2005/0252560 | A1 * | 11/2005 | Anderson | F16K 11/0876 |
| | | | | 137/625.47 |
| 2007/0051335 | A1 * | 3/2007 | Cassina | F16K 5/222 |
| | | | | 123/190.16 |
| 2011/0198525 | A1 | 8/2011 | Yu | |
| 2014/0109970 | A1 * | 4/2014 | Middleton | F16K 5/0207 |
| | | | | 137/1 |
| 2017/0184205 | A1 * | 6/2017 | Eitzinger | F16K 5/0407 |
| 2018/0073654 | A1 * | 3/2018 | Nowell | F16K 27/065 |
| 2018/0149277 | A1 | 5/2018 | Hattan | |
| 2020/0166145 | A1 * | 5/2020 | Kostanski | F16K 27/062 |

FOREIGN PATENT DOCUMENTS

| | | |
|---|---|---|
| FR | 1592242 | 6/1970 |
| GB | 221413 | 9/1924 |
| JP | 10-299911 A | 11/1998 |
| KR | 10-1554315 B1 | 9/2015 |

* cited by examiner

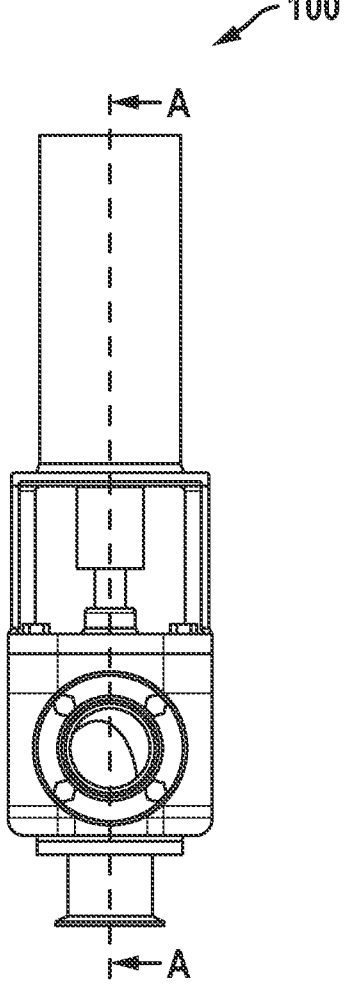
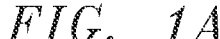
*FIG. 1A*
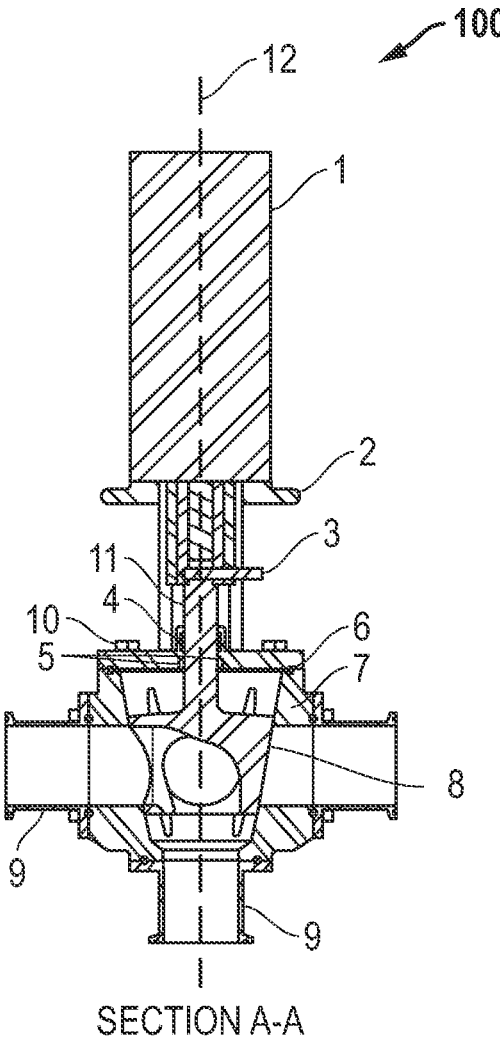
SECTION A-A
*FIG. 1B*

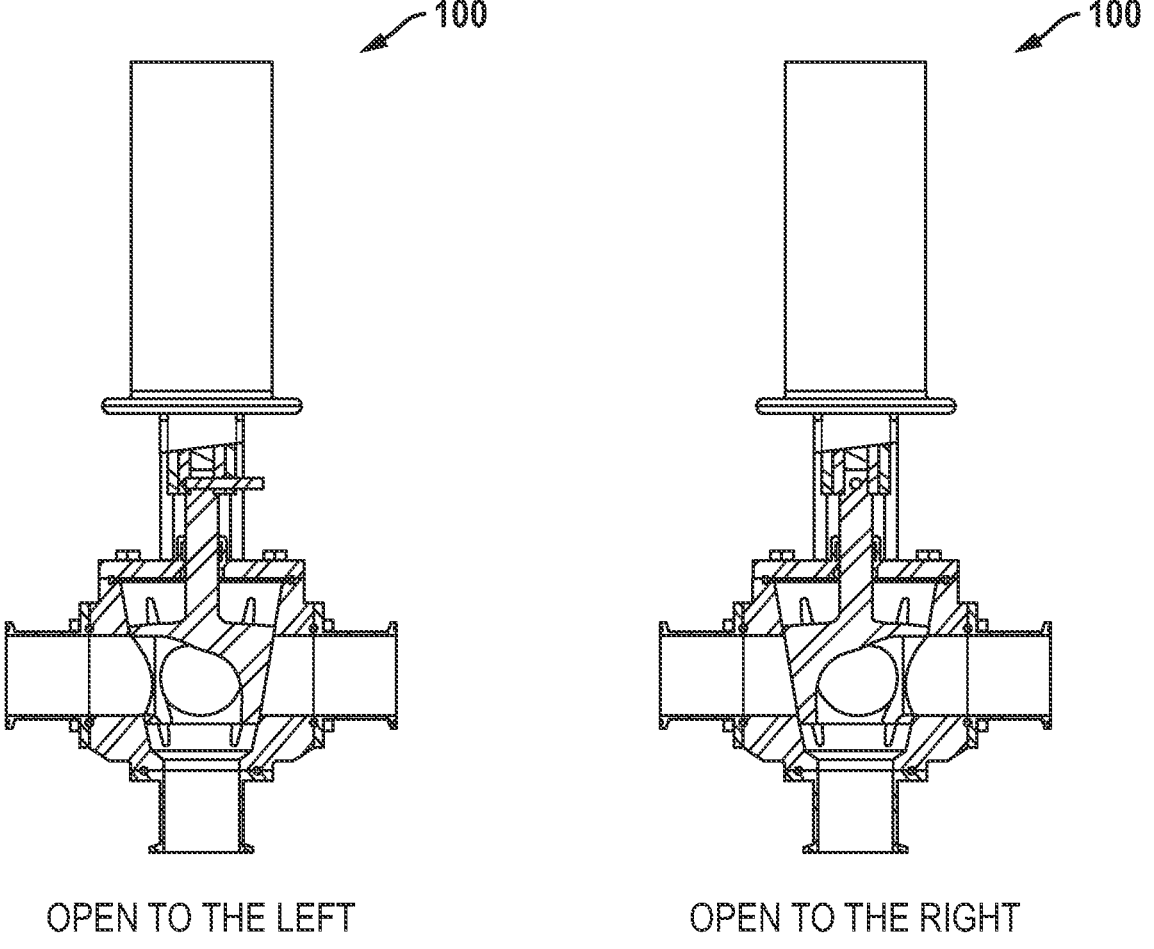
OPEN TO THE LEFT                    OPEN TO THE RIGHT
*FIG. 2A*                              *FIG. 2B*

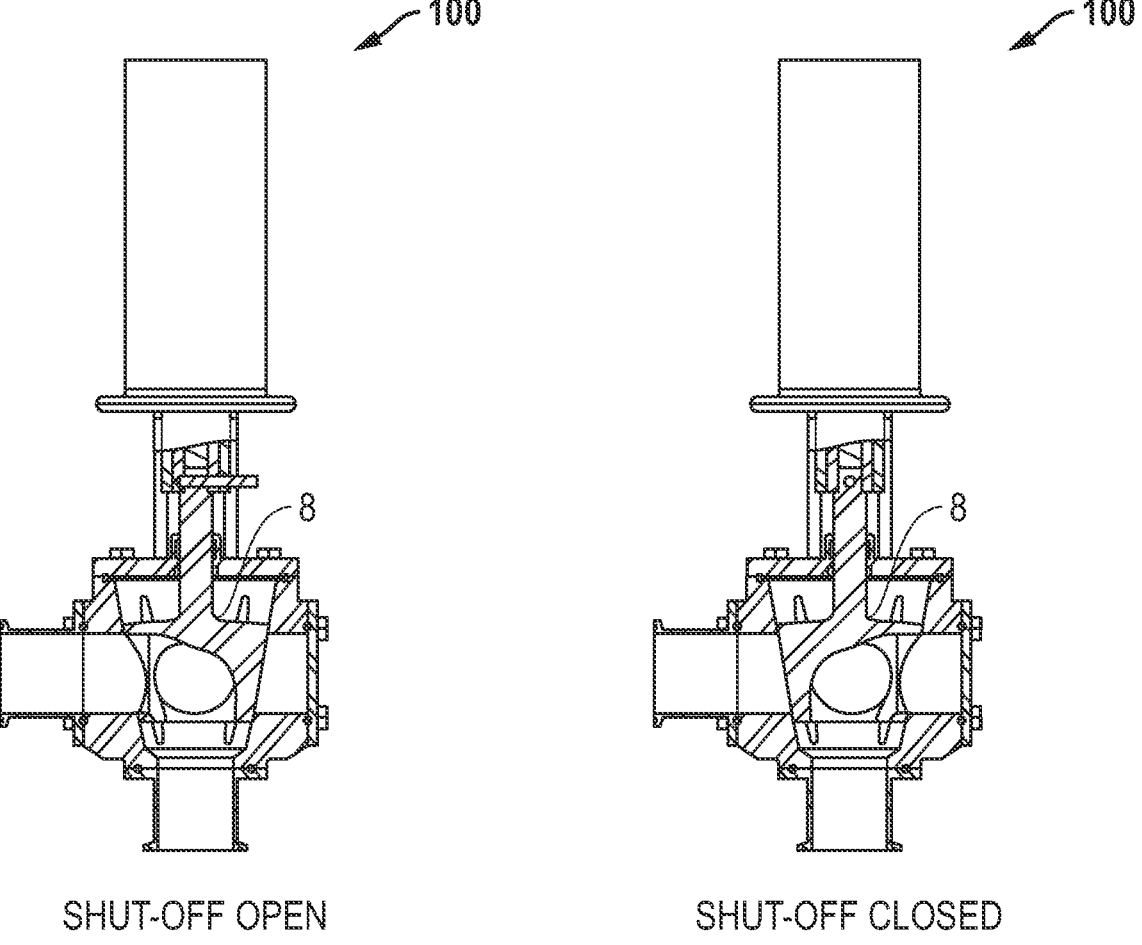
SHUT-OFF OPEN            SHUT-OFF CLOSED
*FIG. 3A*                *FIG. 3B*

SECTION B-B

SECTION C-C

SHUT-OFF CLOSED

SECTION A-A

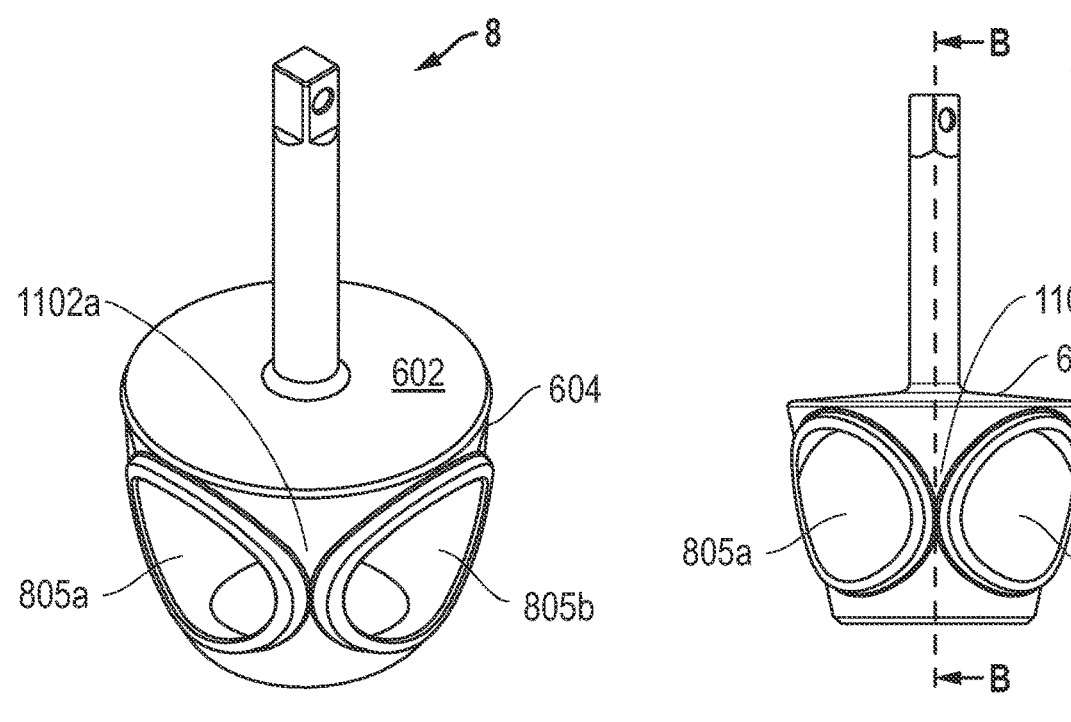
FIG. 11E
FIG. 11F
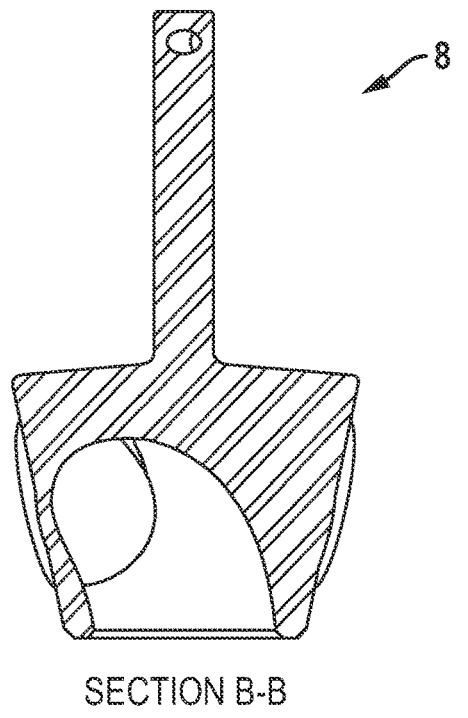
SECTION B-B
FIG. 11G

SECTION A-A

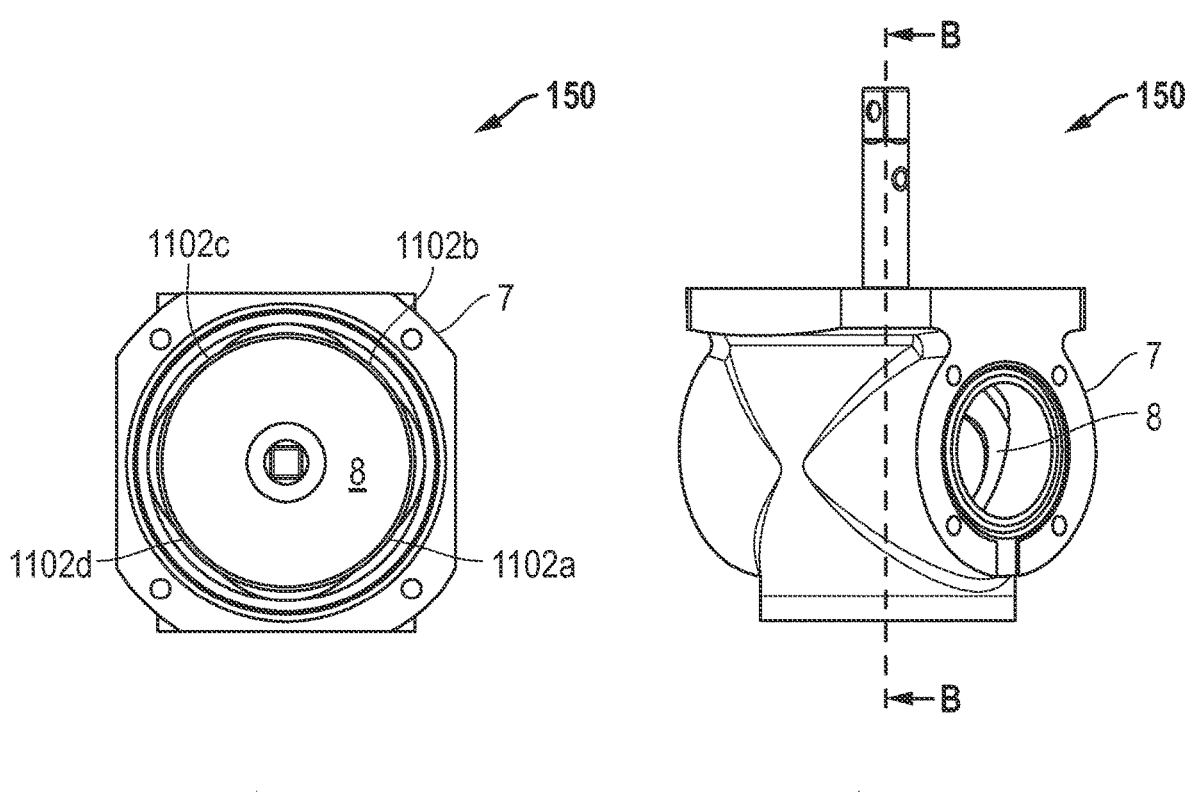
*FIG. 11K*         *FIG. 11L*
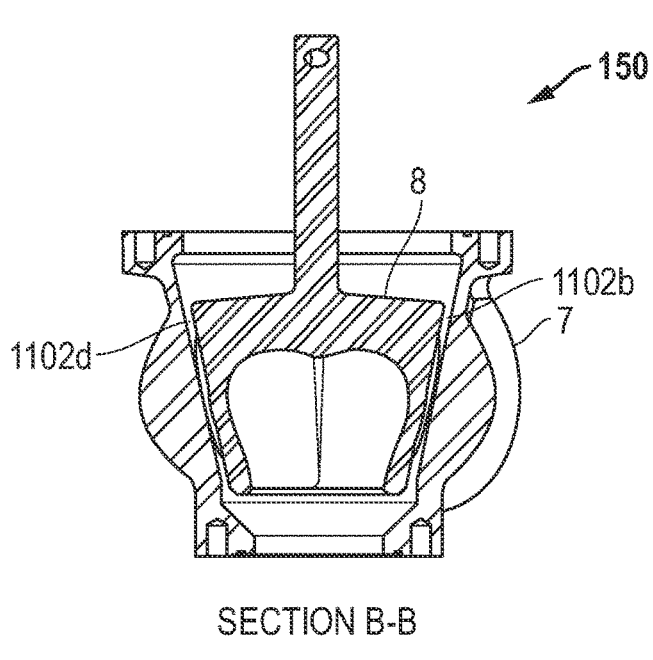
SECTION B-B
*FIG. 11M*

SECTION C-C

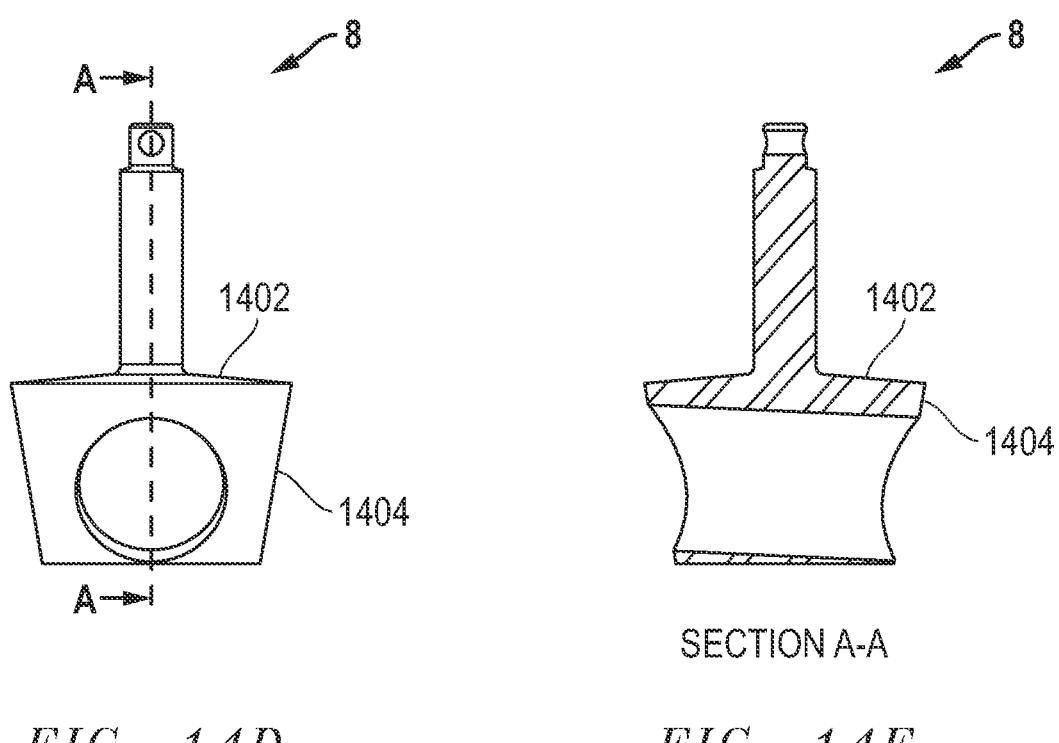
*FIG. 14D*        *FIG. 14E*
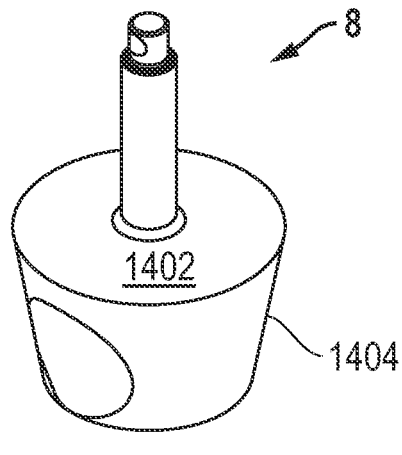
*FIG. 14F*

SECTION A-A

1602b

1602b

1602a

1602a

7

8

1604a

1604b

1606

1608

1610

FULL-FLOW SANITARY VALVE

CROSS-REFERENCE TO RELATED APPLICATIONS

This application claims priority to and is a non-provisional patent application of U.S. Provisional Patent Application Ser. No. 62/909,881, filed on Oct. 3, 2019, and entitled "Full-Flow Sanitary Valve". The foregoing application is hereby incorporated by reference in its entirety.

STATEMENT OF FEDERALLY FUNDED RESEARCH

Not applicable.

TECHNICAL FIELD OF THE INVENTION

The present invention relates in general to the field of valves. In particular, the present invention relates to sanitary valves used in the food processing and food transportation industries.

BACKGROUND OF THE INVENTION

Valves now used in the food processing and food transportation industries must be capable of handling food material without contaminating it and must therefore be cleaned frequently. The valves block the passage of food products when the valve is closed to prevent flow between the inlet and outlet ports, or to direct the flow from the inlet to the outlet port when the valve is opened. Block and Bleed valves (Mix-proof valves) block the flow through both the inlet and outlet ports of the valve, and provide a leakage detection port to atmosphere between the inlet and outlet ports, to prevent any possible mixing of the fluids between the inlet and outlet ports. Some current valve designs require that a valve, to be cleaned, be removed from the system of which it is a component, costing time and effort and requiring either a replacement valve or disablement of at least part of the system while cleaning is performed. It is desirable to have a valve that can be thoroughly cleaned while installed.

SUMMARY OF THE INVENTION

In some embodiments of the disclosure, a sanitary valve is disclosed as including a body including at least two body openings; a plug disposed within the body, rotatable around a vertical axis, moveable along the vertical axis within the body, and including a plug top surface and at least two plug openings in fluid communication; a stem including a first stem end attached to the top plug surface and a second stem end; and an actuator attached to the second stem end and operable to rotate the stem and the plug around the vertical axis and to move the stem and the plug along the vertical axis. In one aspect, one of the at least two body openings is a bottom body opening and one of the at least two plug openings is a bottom plug opening. In another aspect, one of the at least two body openings is a lateral body opening and one of the at least two plug openings is a lateral plug opening. In another aspect, two of the at least two body openings are lateral body openings and two of the at least two plug openings are lateral plug openings. In another aspect, an interior wall of the body includes one or more drainage channels or a sloping segment proximate to a bottom body opening, or both, to reduce trapping fluid or to facilitate cleaning of the sanitary valve. In another aspect, the plug includes a top plug surface that slopes outward and downward from the vertical axis or a lateral plug surface that slopes downward and inward, or both to reduce trapping fluid or to facilitate a flow of fluid to a bottom of the plug. In another aspect, the sanitary valve is configured to be cleaned without removal from a system of which it is a component. In another aspect, the sanitary valve is configured to be cleaned without disassembly. In another aspect, the sanitary valve is configured to be cleaned when the plug is disposed upward along the vertical axis from a seated position within an interior of the body. In another aspect, at least a portion of an interior of the body contains drainage features to facilitate reducing trapping of fluid, or cleaning, or both. In another aspect, at least a portion of the plug or a portion of an interior of the body, or both, is coated with one or more materials that facilitate reducing trapping of fluids, or cleaning, or both. In another aspect, the body includes steel, stainless steel, any compatible metal, plastic, polymer, plastic-polymer composite, plastic-metal composite, polymer-metal composite, plastic-coated metal, polymer-coated metal, or some combination thereof. In another aspect, the plug includes steel, stainless steel, any compatible metal, plastic, polymer, plastic-polymer composite, plastic-metal composite, polymer-metal composite, plastic-coated metal, polymer-coated metal, or some combination thereof.

In some embodiments of the disclosure, a sanitary valve kit is disclosed as including a sanitary valve including a body including at least two body openings; a plug disposed within the body, rotatable around a vertical axis, moveable along the vertical axis within the body, and including a plug top surface and at least two plug openings in fluid communication; a stem including a first stem end attached to the top plug surface and a second stem end; and an actuator attached to the second stem end and operable to rotate the stem and the plug around the vertical axis and to move the stem and the plug along the vertical axis. In one aspect, one of the at least two body openings is a bottom body opening and one of the at least two plug openings is a bottom plug opening. In another aspect, one of the at least two body openings is a lateral body opening and one of the at least two plug openings is a lateral plug opening. In another aspect, two of the at least two body openings are lateral body openings and two of the at least two plug openings are lateral plug openings. In another aspect, an interior wall of the body includes one or more drainage channels or a sloping segment proximate to a bottom body opening, or both, to reduce trapping fluid or to facilitate cleaning of the sanitary valve. In another aspect, the plug includes a top plug surface that slopes outward and downward from the vertical axis or a lateral plug surface that slopes downward and inward, or both to reduce trapping fluid or to facilitate a flow of fluid to a bottom of the plug. In another aspect, the sanitary valve is configured to be cleaned without removal from a system of which it is a component. In another aspect, the sanitary valve is configured to be cleaned without disassembly. In another aspect, the sanitary valve is configured to be cleaned when the plug is disposed upward along the vertical axis from a seated position within an interior of the body. In another aspect, at least a portion of an interior of the body contains drainage features to facilitate reducing trapping of fluid, or cleaning, or both. In another aspect, at least a portion of the plug or a portion of an interior of the body, or both, is coated with one or more materials that facilitate reducing trapping of fluids, or cleaning, or both. In another aspect, the body includes steel, stainless steel, any compatible metal, plastic, polymer, plastic-polymer composite, plastic-metal composite, polymer-metal composite, plastic-coated metal, polymer-coated metal, or some combination thereof. In another aspect, the plug includes steel, stainless steel, any compatible metal, plastic, polymer, plastic-polymer composite, plastic-metal composite, polymer-metal composite, plastic-coated metal, polymer-coated metal, or some combination thereof.

BRIEF DESCRIPTION OF THE DRAWINGS

For a more complete understanding of the features and advantages of the present invention, reference is now made to the detailed description of the invention along with the accompanying figures, in which:

FIGS. 1A and 1B show a side view and a cross section, respectively, of the present invention, the sanitary valve, in the angle/divert shut-off configuration and in the open (divert) position.

FIGS. 2A and 2B show partial cut-away views of the sanitary valve in angle/divert configuration and in two divert positions: open to the left and open to the right, respectively.

FIGS. 3A and 3B show partial cut-away views of the sanitary valve in angle/divert configuration and in two-positions: with the shut-off open and the shut-off closed, respectively.

FIGS. 14D-14F show a cross-section views of the plug of the uni-directional horizontal shut-off sanitary valve.

4

Figure 15A:
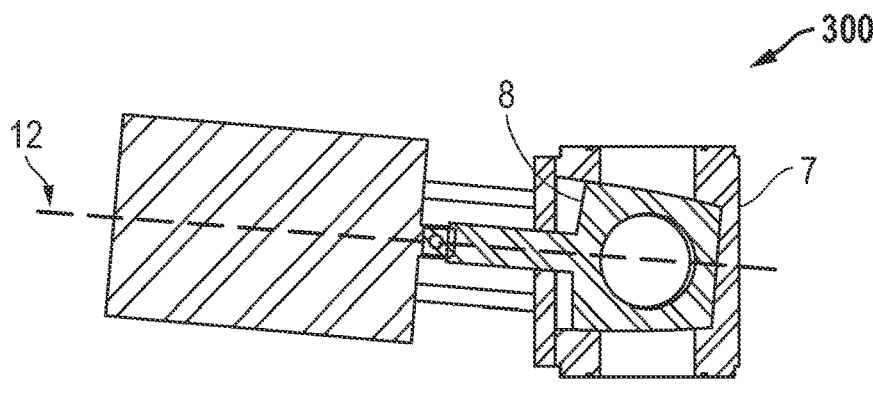
Figure 15B:
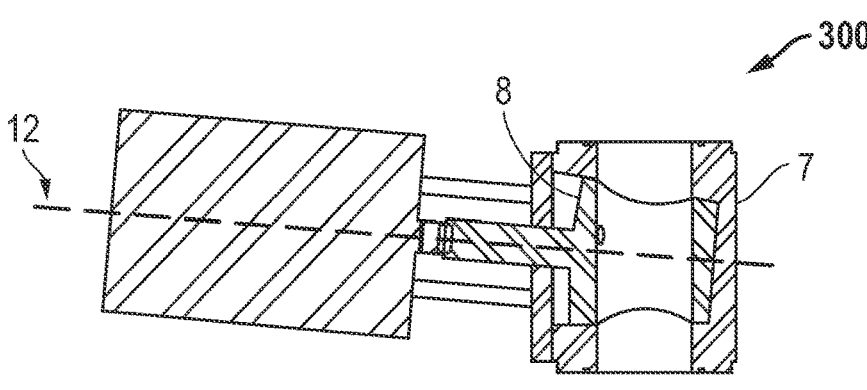
Figure 15C:
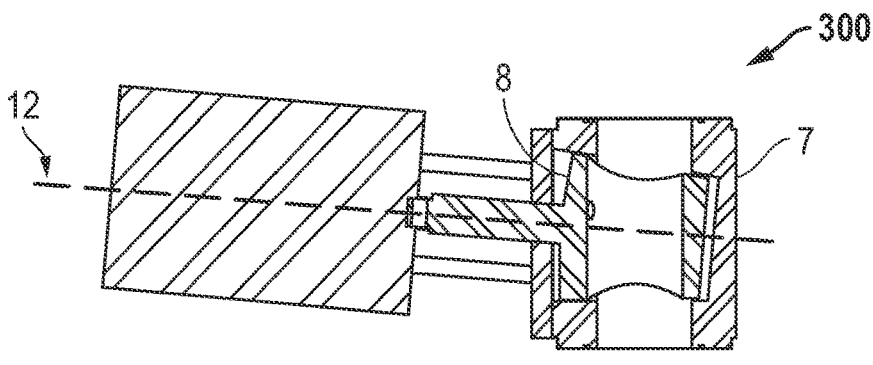

FIGS. 15A-15C show three views of a two-port vertical shut-off sanitary valve.

Figure 16A:
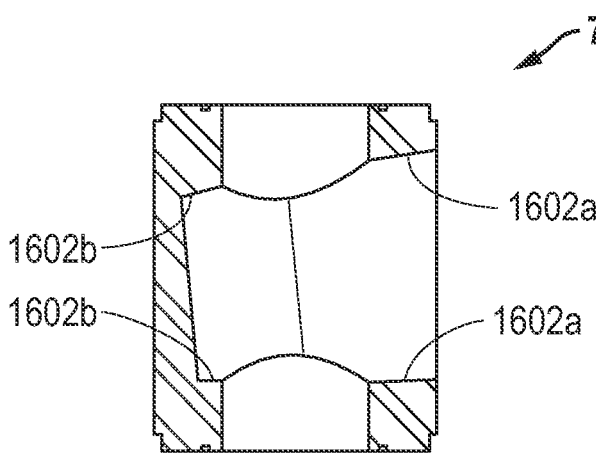

FIG. 16A shows a cross-section of the body of the two-port vertical shut-off sanitary valve.

Figure 16B:
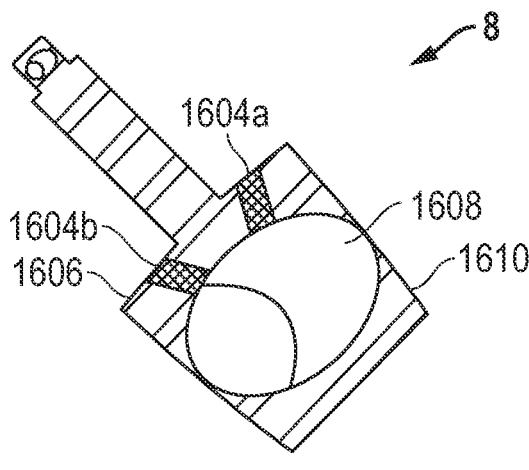

FIG. 16B shows a cross-section of the plug of the vertical shut-off sanitary valve.

Figure 17:
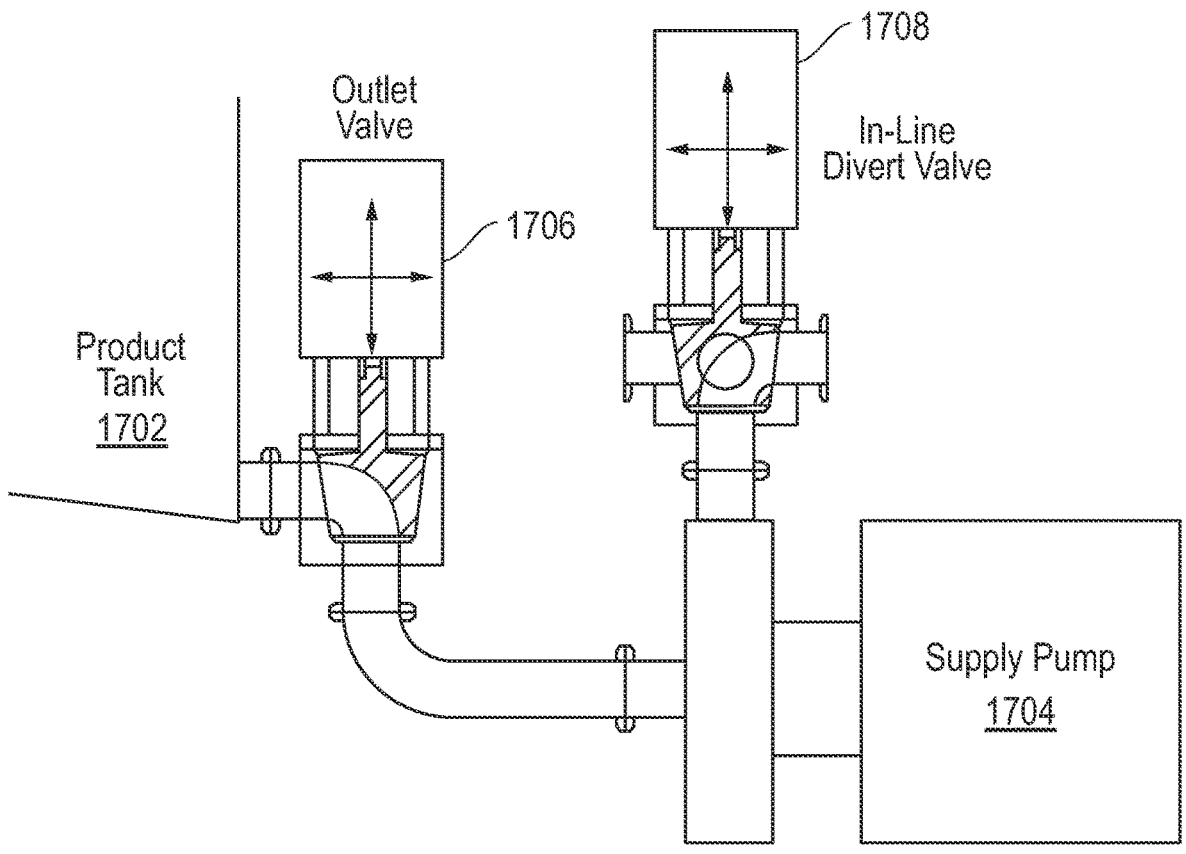

FIG. 17 shows a typical tank discharge application of a sanitary valve.

Figure 18:
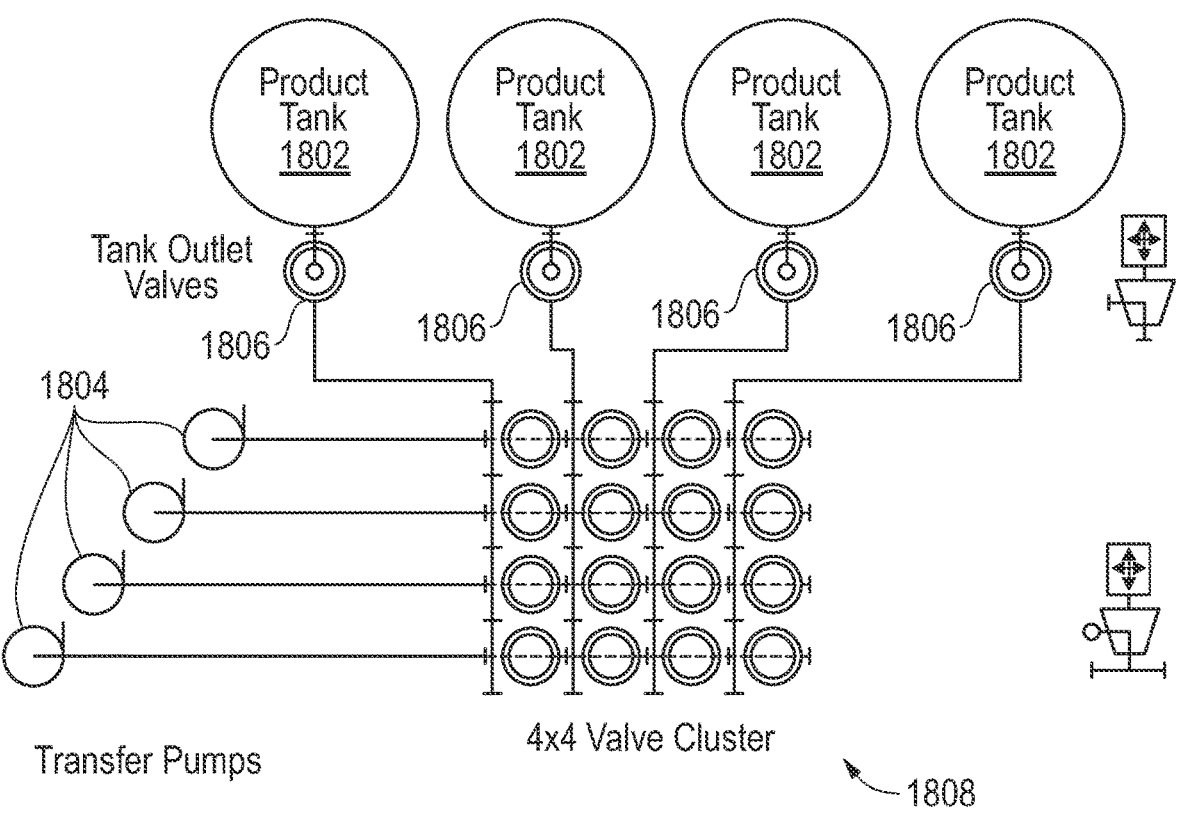

FIG. 18 shows a typical cluster application of a sanitary valve.

Figure 19A:
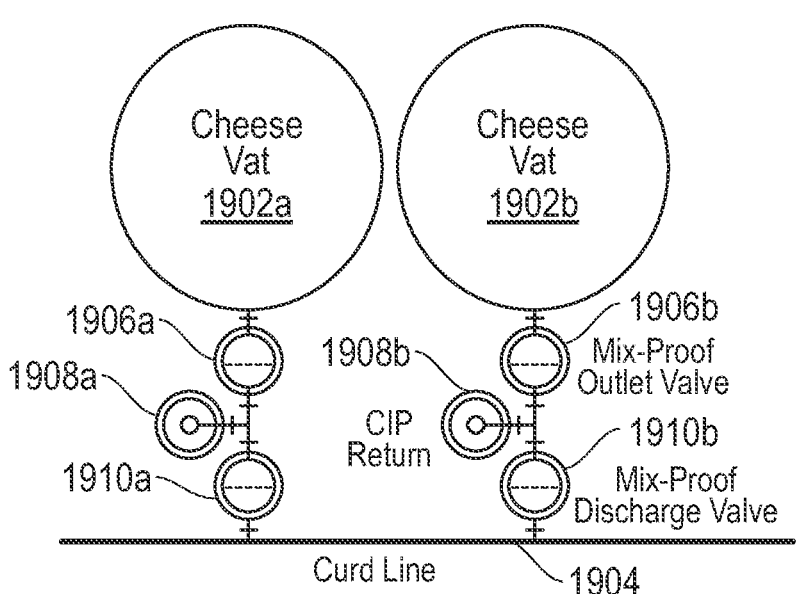
Figure 19B:
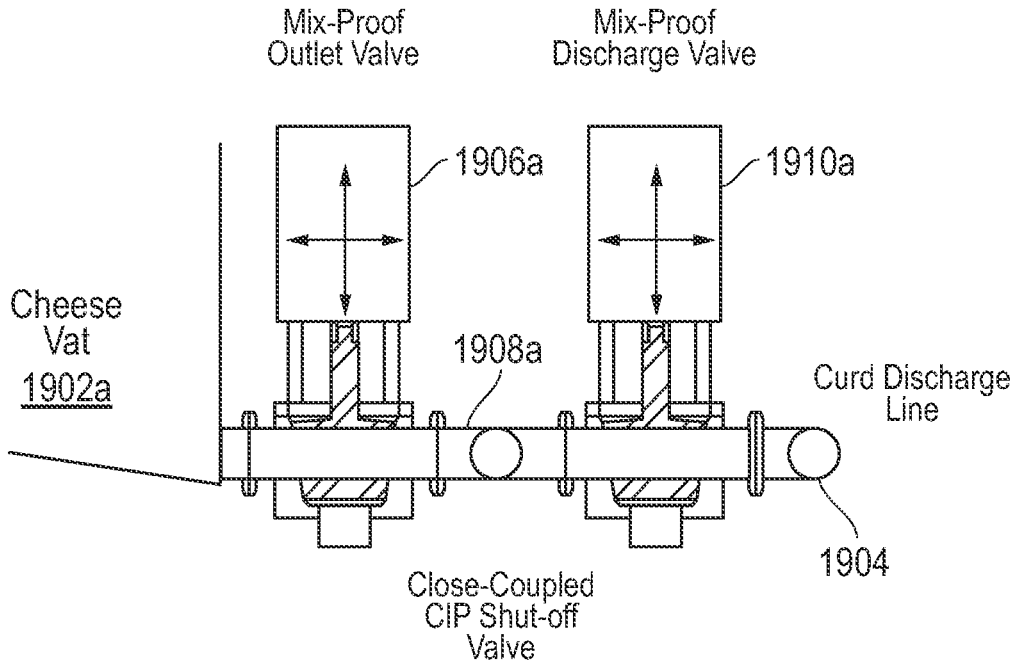

FIGS. 19A and 19B show a typical cheese vat application of a sanitary valve.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention, the Full-Flow Sanitary Valve (FFSV), offers a full flow, bi-directional flow capability that can be cleaned-in-place (CIP), a key sanitary feature that is not available with any other sanitary ball, disc, or plug valve. The present invention is compliant with sanitary standards and is suitable for dairy processing under Pasteurized Milk Ordinance (PMO) regulations. The present invention allows product fluid to flow unimpeded. Many configuratons of the present invention are "piggable", that is, cleanable with a device that can be pushed or pulled through the valve. All wetted components of the present invention are self-draining and designed to allow cleaning fluids to thoroughly clean all possible areas where product can become entrapped, without removal of the valve from the system in which installed or disassambly of the valve. The present invention has a low life-cycle cost because it is simple to operate and maintain because of few moving parts and no disposable seat seals. The present invention is modular: it is reconfigurable in the field from shut-off to divert capability by simply changing the port connections. The lift and rotate feature and nearly pressure balanced plug design of the present invention virtually eliminates the possibility of hydraulic hammer and only requires a fraction of the typically holding force common to most seat valves.

The present invention has at least five basic configurations to accommodate the different possible processes commonly found in the food processing industry: angle-divert shut-off sanitary valve 100 (three ports); bi-directional horizontal shut-off sanitary valve 200 (two ports); angle-divert shut-off sanitary valve 150 (two ports); uni-directional horizontal shut-off sanitary valve (250) (two ports) and vertical shut-off sanitary valve 300 (two ports). In all embodiments of the present invention, the plug rotates 90 degrees to direct the flow of product to the connections or stop the flow of the product.

Figure 1C:
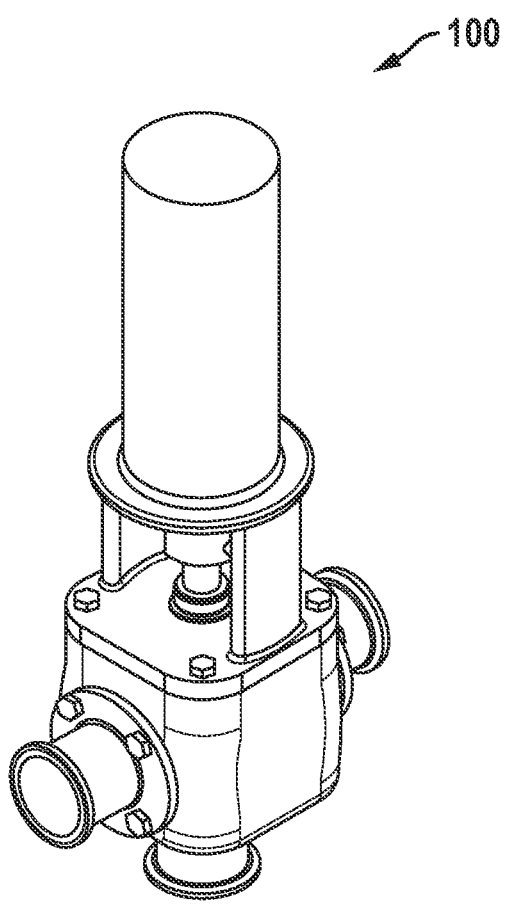
FIG. 1C shows an orthogonal view of the sanitary valve.

FIGS. 1A and 1B show a side view and a cross section, respectively, of an embodiment of the present invention, the sanitary valve 100, in the angle/divert shut-off configuration and in the open (divert) position. The cross-section shown in FIG. 1B is at the line A-A in FIG. 1A. The sanitary valve 100 includes the actuator 1, the bonnet 2, the plug screw 3, the split bushing 4, the stem o-ring 5, the body gasket 6, the body 7, the plug 8, connections 9, bolts 10, a stem 11 along a vertical axis 12. All configurations of the sanitary valve 100, and all configurations of the sanitary valves 150, 200, 250, and 300, which are described elsewhere herein, include these components (The sanitary valves 150, 200, 250, and 300 are not shown in FIGS. 1A-10C; see FIGS. 11A-11P for sanitary valve 150; see FIGS. 11A-13 for sanitary valve 200; see FIGS. 20A-22C for sanitary valve 250; and see FIGS. 14A-16 for sanitary valve 300). FIG. 1C shows an orthogonal view of the sanitary valve 100.

Embodiments of the present invention come with differently-sized bodies 7 but with body interiors sized to accommodate plugs 8 of the same size, so that each particular plug 8 is usable with differently-sized bodies 7.

The body 7 and stem 11 may be constructed with various materials including those authorized by sanitary standards, such as stainless steel. Use of other materials such as plastic, polymers, plastic-polymer composite, plastic-metal composite, polymer-metal composite, plastic-coated metal, polymer-coated metal, or some combination thereof can also be used if authorized by the applicable juristication having authority. At least a portion of the plug or a portion of an interior of the body, or both, may be coated with one or more materials that facilitate reducing trapping of fluids, or cleaning, or both.

In describing the present invention, the relative positions of various aspects of the sanitary valves 100, 200, 250, and 300 are defined as follows, regardless of the valve's actual orientation in space, unless otherwise specified. "Top" is the side of the the body 7 or the plug 8 toward the stem 11 and "bottom" is the side of the body 7 or the plug 8 away from the stem 11. "Lateral" is a side of the body 7 or the plug 8 between the top and the bottom. "Upward" and 'lifted" are toward the top of the body 7 or the plug 8, and "downward" and "lowered" are toward the bottom of the body 7 or the plug 8. "Outward" is away from the vertical axis 12, and inward is toward the vertical axis 12.

The plug 8 is positioned within the body 7, rotatable around the vertical axis 12, moveable along the vertical axis 12 within the body 7, and includes a plug top surface and at least two plug openings in fluid communication. The stem 11 includes a first stem end attached to the top plug surface and a second stem end. The actuator 1 is attached to the second stem end and operable to rotate and to move the stem and the plug along the vertical axis 12.

In the angle-divert shut-off sanitary valve 100, the body 7 has two lateral body openings and a bottom body opening, and the plug 8 has two lateral plug openings and a bottom plug opening. In sanitary valve 150, the body 7 has two lateral body openings and a bottom body opening, and the plug has two lateral plug openings and a bottom body opening. In both of the horizontal shut-off sanitary valves 200 and 250, and in the vertical shut-off sanitary valve 300, the body 7 has two lateral body openings and no bottom body opening, and the plug 8 has two lateral plug openings and no bottom plug opening.

Features described with reference to any specific sanitary valves 100, 150, 200, 250, and 300 may be features of any of the sanitary valves 100, 150, 200, 250, 300, or any other embodiment of the present invention, where the specific function of the valve does not preclude a given feature. For example, any feature of the body 7 or the plug 8 to facilitate cleaning in place, such as the sloping interior surface 502 (see FIGS. 5A and 5D), may be features of sanitary valves 100, 150, 200, 250, 300, or any other embodiment of the present invention.

While the body 7 is shown herein a having a roughly cubical shape, the body 7 can have any shape, with lateral openings in any positions, to satisfy circumstances, desires, or needs, and that can accommodate the plug 8 within, e.g., cylindrical or spherical.

FIGS. 2A and 2B show partial cut-away views of the sanitary valve 100 in angle/divert configuration and in two divert positions: open to the left and open to the right, respectively. In FIG. 2A, the lateral plug opening is rotated to be aligned with the first lateral body opening and a first lateral connector, so that the sanitary valve 100 is open to the left. With the valve in this position, fluid is able to flow from a bottom connector through the sanitary valve 100 to the first lateral connector. In FIG. 2B, the lateral plug opening is rotated to be aligned with the second lateral body opening and a second lateral connector, so that the sanitary valve 100 is open to the right. With the valve in this position, fluid is able to flow from the bottom connector through the sanitary valve 100 to the second lateral connector.

FIGS. 3A and 3B show partial cut-away views of the sanitary valve 100 in angle/divert configuration and in two positions: with the shut-off open and the shut-off closed, respectively. In FIG. 3A, the sanitary valve is in the shut-off open position. With the valve in this position, the plug 8 is rotated so that the lateral plug opening is aligned with a lateral body opening, and fluid can flow through the sanitary valve 100. In FIG. 3B, the plug 8 is rotated so that the lateral plug opening not aligned with a body opening, and fluid cannot flow through the sanitary valve 100.

Figures 4A, 4B, 4C:
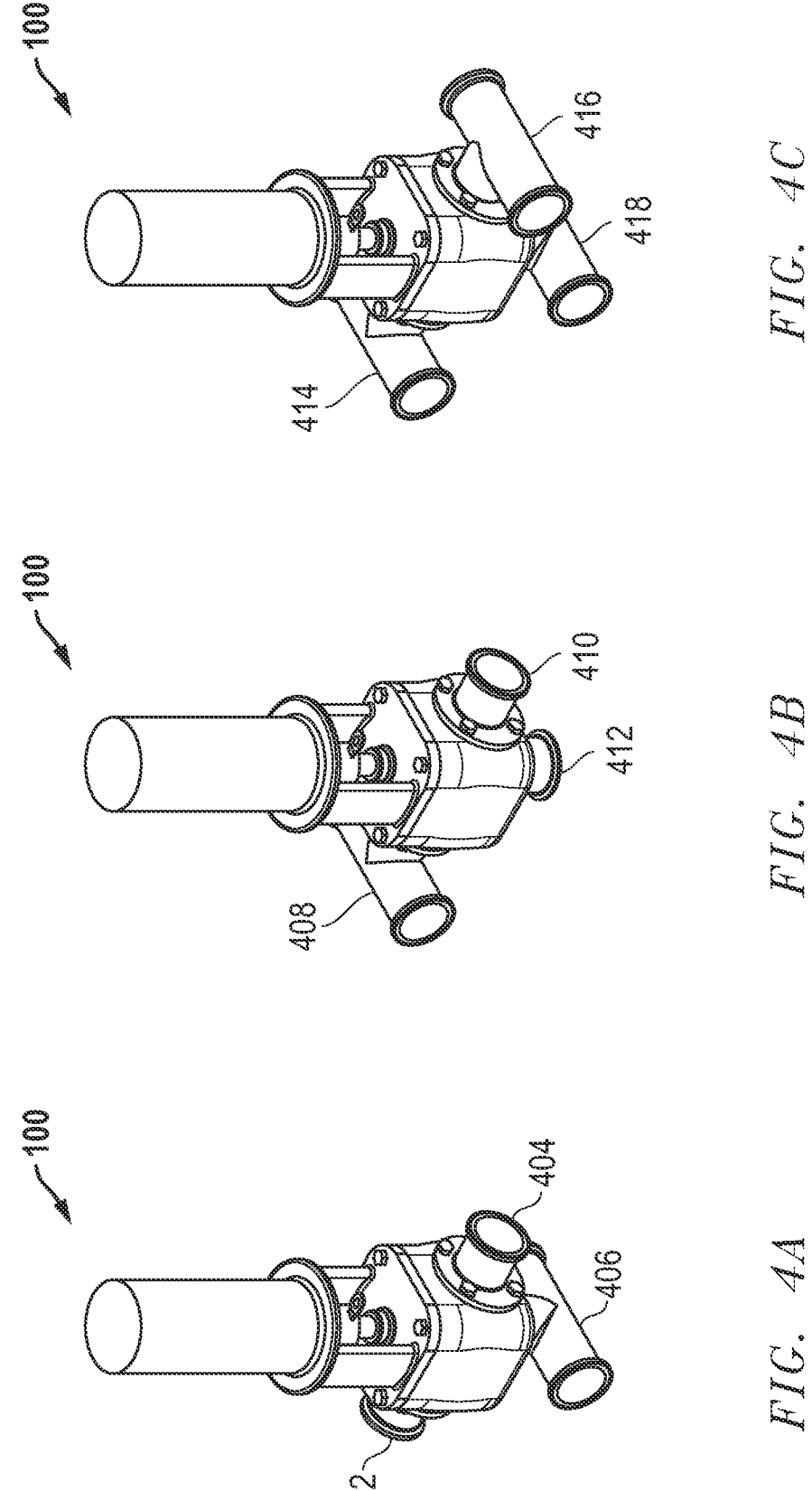
FIGS. 4A-4C show three non-limiting examples of divert configurations that are available through different connection fixtures.

FIGS. 4A-4C show three non-limiting examples of divert configurations that are available through different connection fixtures. In FIG. 4A, each of the lateral body openings are connected to a single-outlet connector 402 and 404, and the bottom body opening is connected to a two-outlet connector 406. In FIG. 4B, one of the body lateral openings is connected to a two-outlet connector 408, the other body lateral opening is connected to a single-outlet connector 410, and the bottom body opening is connected to a single outlet connector 412. In FIG. 4C, each of the body lateral openings are connected to a two-outlet connector 414 and 416, and the body bottom opening is connected to a two-outlet connector 418. Generally, each body opening may be connected to a connector with one or more outlets.

Figure 5A:
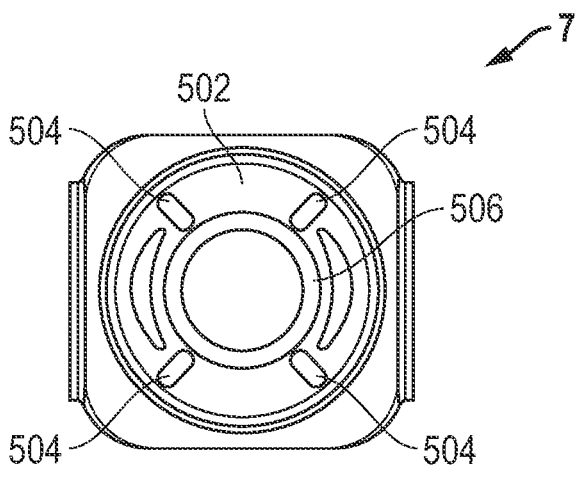
FIGS. 5A-5D show features of the body that allow proper drainage of the sanitary valve 100 and that allow cleaning in place.
Figure 5B:
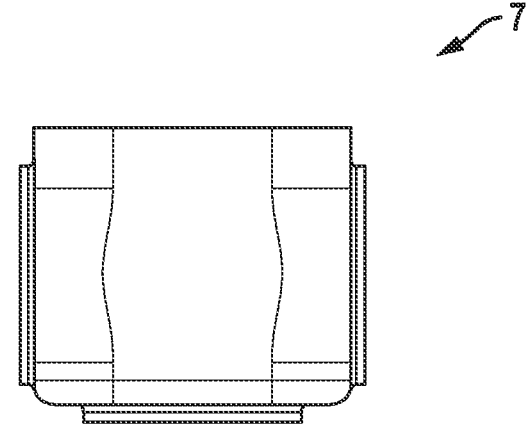
Figure 5C:
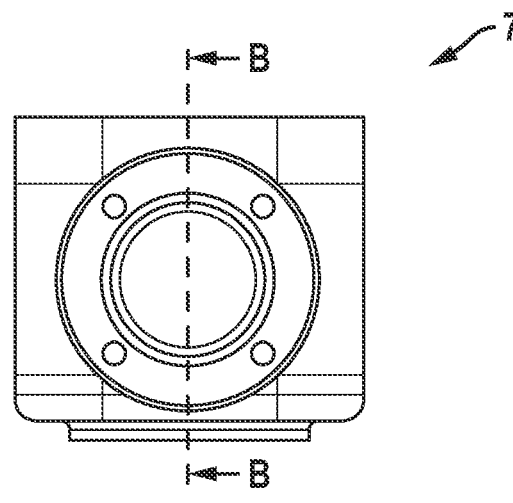
Figure 5D:
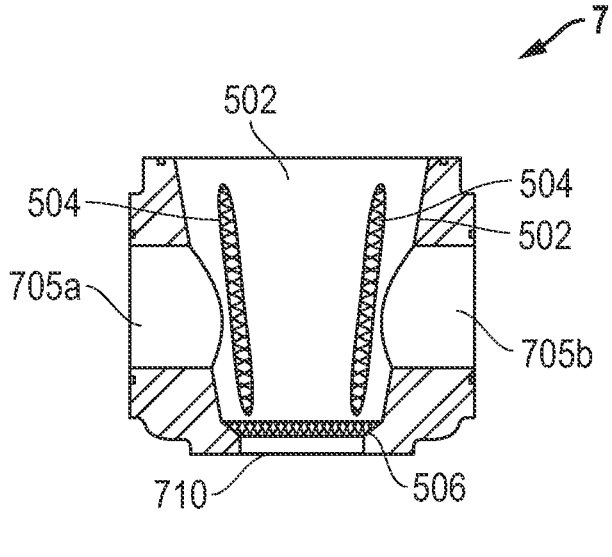

FIGS. 5A-5D show features of the body 7 that allow proper drainage of the sanitary valve 100 and that allow cleaning in place. FIG. 5A shows a top view of the interior of the body 7. The interior surface 502 of the body 7 is sloped inward from the top to the bottom body opening to facilitate the flow of fluid throughout the interior of the valve, and down the interior surface to the bottom body opening. The interior surface 502 of the body 7 includes one or more drainage channels 504 to allow fluid to flow from above the plug 8 (not shown) in its seated position to the bottom body opening as opposed to being trapped in the sanitary valve 100. The bottom of the interior surface of the body 7 includes a sloping segment 506 that reduces or prevents fluid from being trapped within the interior of the body 7. FIG. 5B shows an exterior view of the body 7. FIG. 5C shows another exterior view of the body 7. FIG. 5D shows a cross-section of the body 7, making visible the interior surface 502, drainage channels 504, and the sloping segment 506. The cross-section shown in FIG. 5D is at the line B-B in FIG. 5C. FIG. 5D also shows the lateral body openings 705a, 705b and the bottom body opening 710.

Figure 6A:
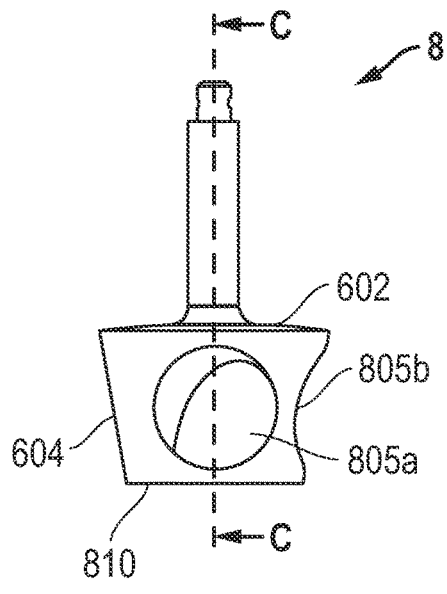
FIGS. 6A and 6B show a side view and a cross-sectional view of the plug, respectively, showing features of the plug that allow proper drainage of the sanitary valve and allow cleaning in place.
Figure 6B:
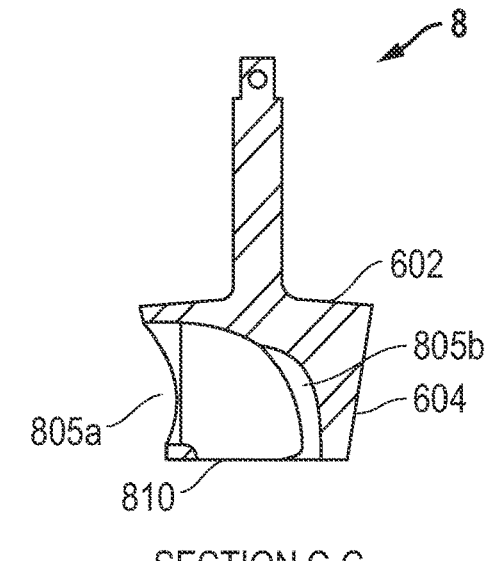
Figure 6C:
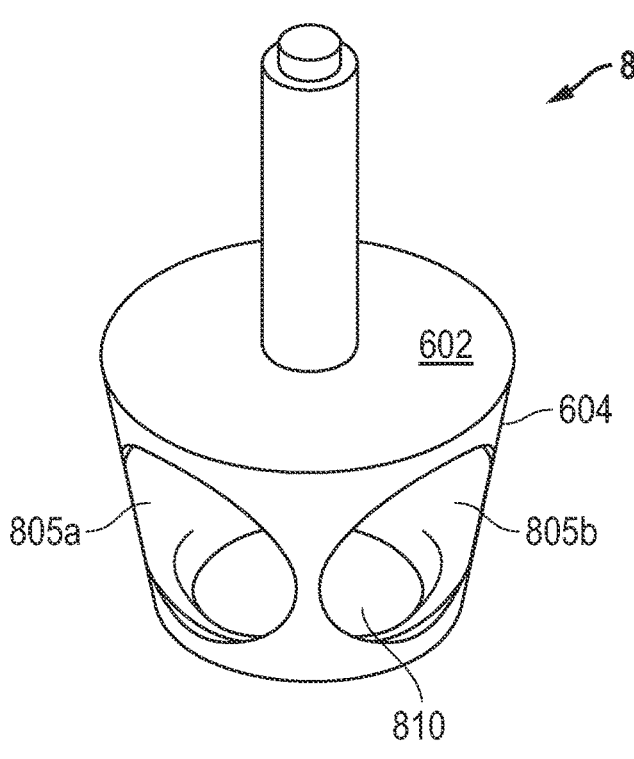
FIG. 6C shows a perspective view of the plug.

FIGS. 6A and 6B show a side view and a cross-sectional view of the plug 8, respectively, showing features of the plug 8 that allow proper drainage of the sanitary valve 100 and facilitate cleaning in place. The top plug surface 602 is sloped outward and downward and the lateral plug surface 604 is sloped downward and inward to facilitate the flow of fluid to the bottom of the plug. The cross-section shown in FIG. 6B is at the line C-C in FIG. 6A. FIG. 6C shows a perspective view of the plug 8 with top plug surface 602 and lateral plug surface 604. FIGS. 6A, 6B, and 6C also show the lateral plug openings 805a, b and the bottom plug opening 810.

Figure 7:
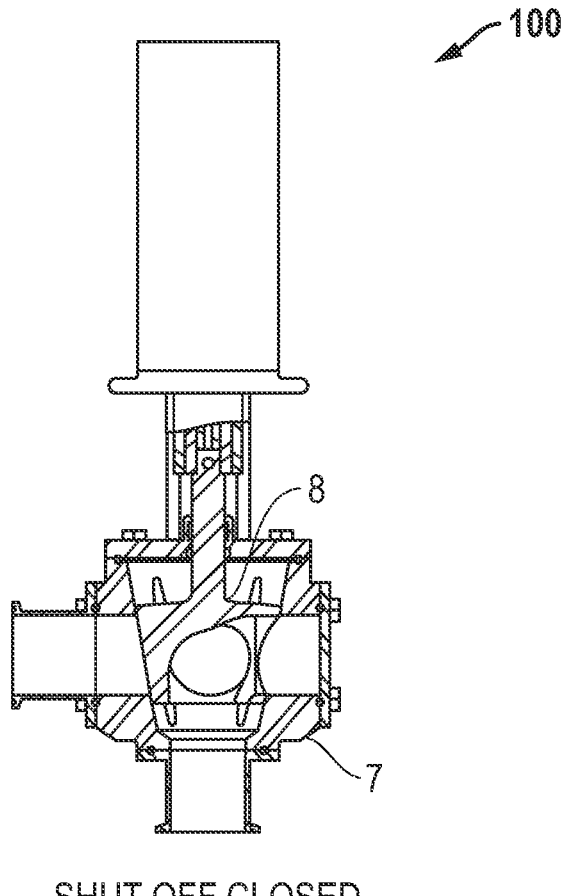
FIG. 7 shows the sanitary valve with the plug in its seated position within the body and rotated to the shut-off closed position.
Figures 8A, 8B, 8C:
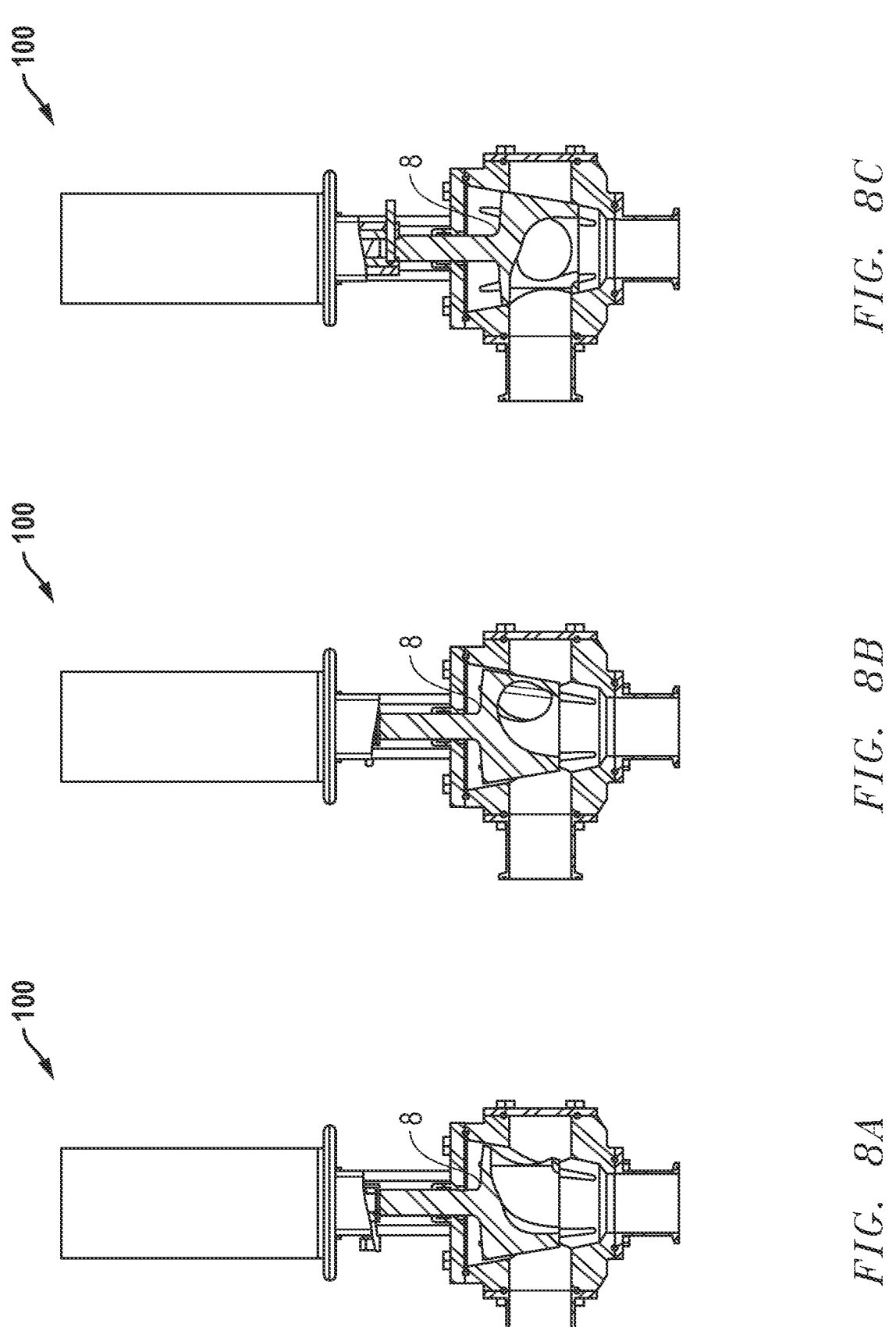
FIGS. 8A-8C show three exemplary, non-limiting views of the sanitary valve at the start of product flow, with the plug in three different positions.
Figures 9A, 9B, 9C:
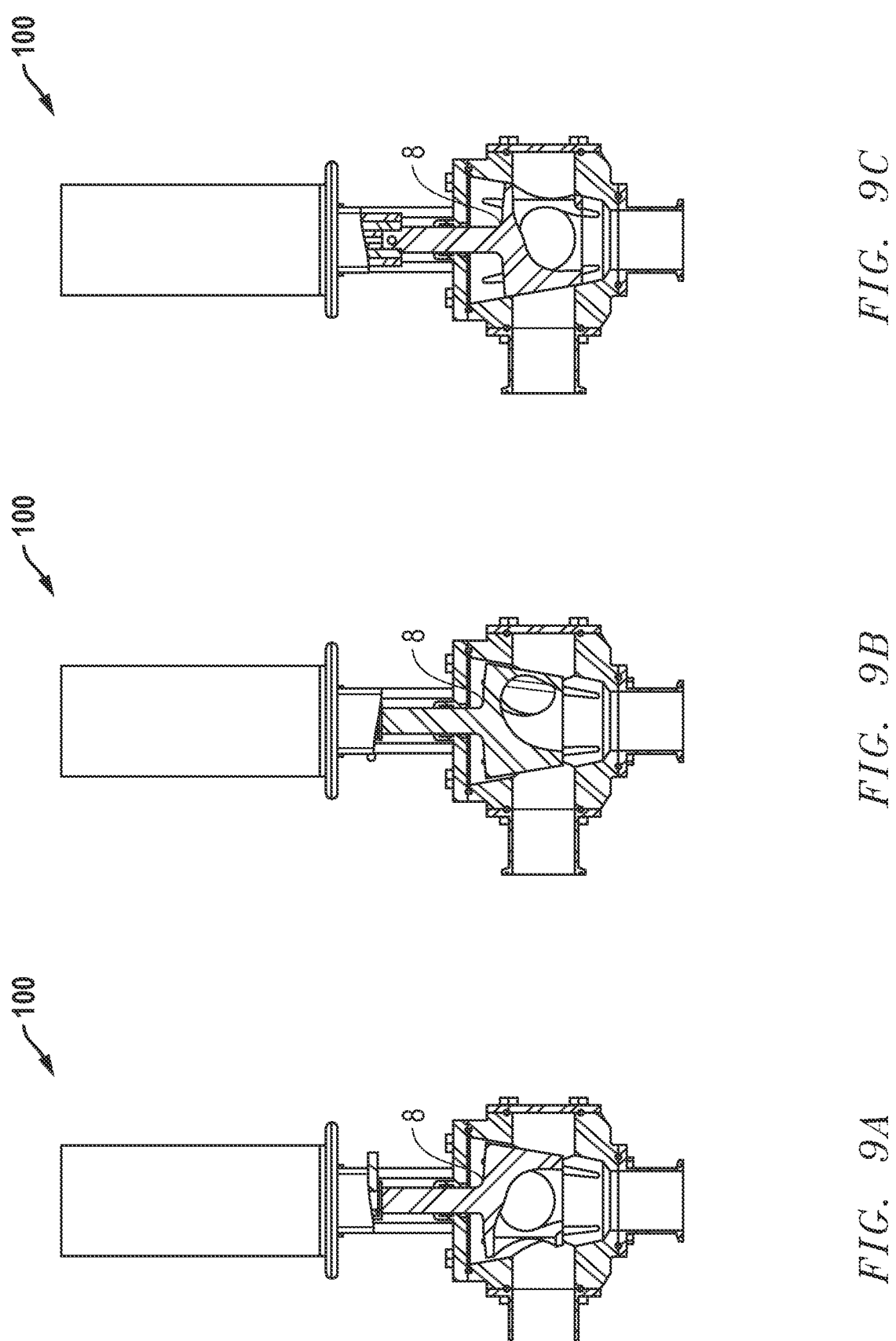
FIGS. 9A-9C show three exemplary, non-limiting views of the sanitary valve at the end of product flow, with the plug in three different positions.

FIGS. 7, 8A-8C and 9A-9C show the sanitary valve 100 in various positions during operation. FIG. 7 shows the sanitary valve 100 with the plug 8 in a starting position, rotated to the shut-off closed position and in its seated position within the body 7. FIGS. 8A-8C show three exemplary, non-limiting views of the sanitary valve 100 at the start of product flow, with the plug 8 in three different positions. In FIG. 8A, the plug 8 is in its lifted position and in the closed position. In FIG. 8B, the plug 8 is rotated part-way from the closed position to the open position, while in its lifted position. In the FIG. 8C, the plug 8 has been lowered to its seated position and is in the open position. FIGS. 9A-9C show three exemplary, non-limiting views of the sanitary valve 100 at the end of product flow, with the plug 8 in three different positions. In FIG. 9A, the plug 8 is in its lifted position and in the open position. In FIG. 9B, the plug 8 is rotated part-way from the open position to the closed position, while in its lifted position. In FIG. 9C, the plug 8 has been lowered to its seated position and is in the closed position.

Figure 10A:
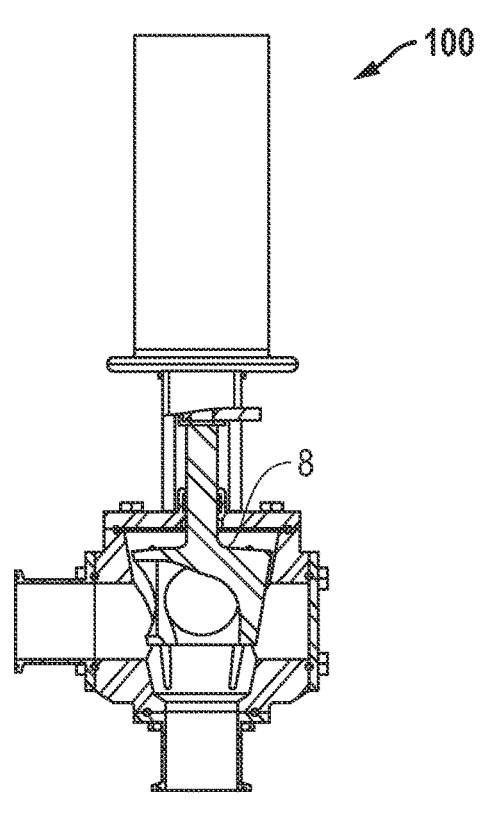
FIGS. 10A and 10B show two views of the sanitary valve during cleaning-in-place (CIP) operation.
Figure 10B:
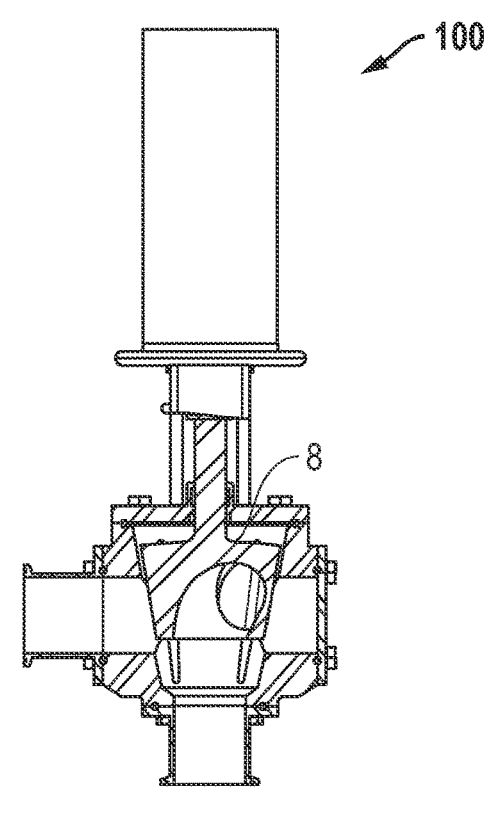
Figure 10C:
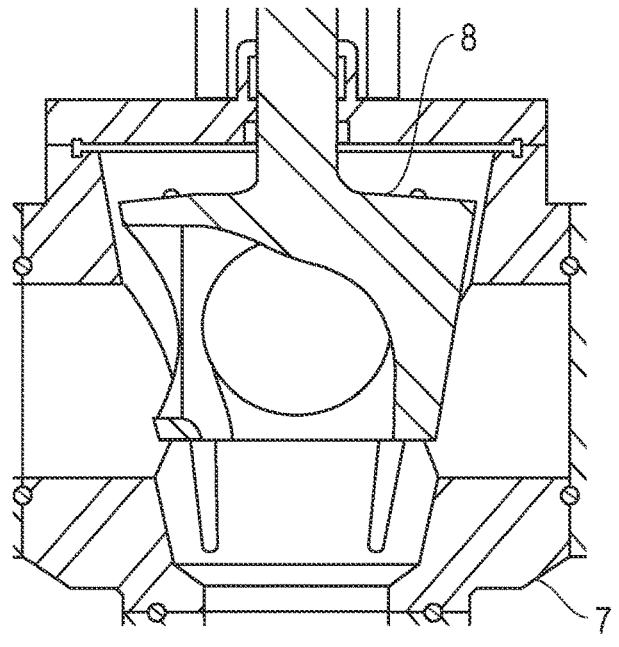
FIG. 10C shows a cross-sectional view of the sanitary valve with the plug moved vertically upward from its seated position within the body to allow the sanitary valve to be cleaned in place.

FIGS. 10A and 10B show two views of the sanitary valve 100 during a cleaning-in-place (CIP) operation, which can be performed while the sanitary valve 100 remains installed in the system of which it is a component. FIG. 10A shows the plug 8 lifted for CIP. As shown in FIG. 10B, the plug 8 may be rotated during CIP to facilitate cleaning. FIG. 10C shows a cross-sectional view of the sanitary valve 100 with the plug 8 moved along the vertical axis 12 from its seated position within the body 7 to allow the sanitary valve 100 to be cleaned in place. Typically, the plug 8 is lifted about 5 mm from its seated position by the actuator 1. When the plug 8 is in this position, all valve surfaces that come into contact with the fluid being handled, that is, wetted surfaces, are exposed within the sanitary valve 100 so that a cleaning solution can be applied to clean those surfaces without removing the sanitary valve 100 from the system of which it is a component.

Figure 11A:
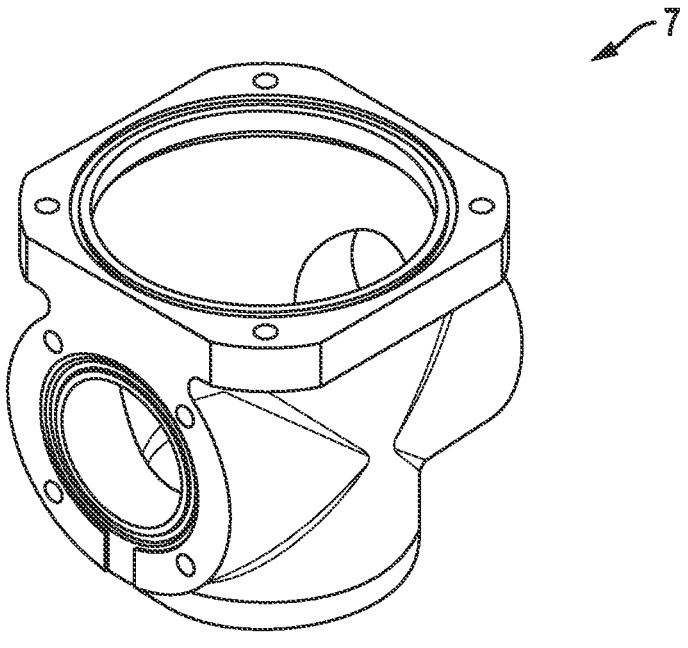
FIGS. 11A-11P show aspects of a body and plug of a sanitary valve, separately and with the plug seated in the body.
Figure 11B:
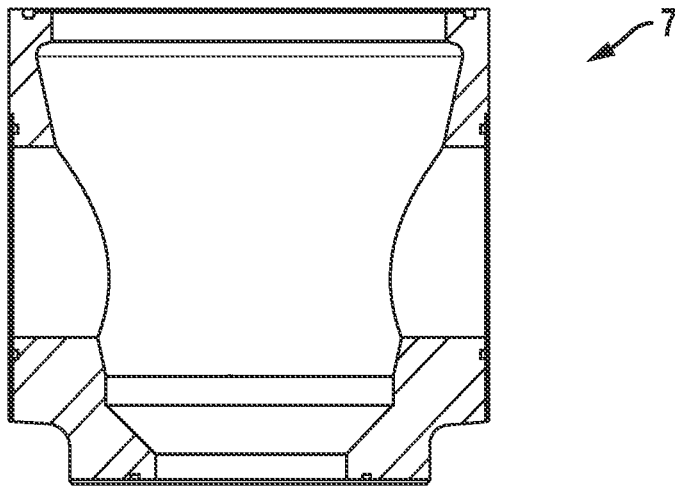
Figure 11C:
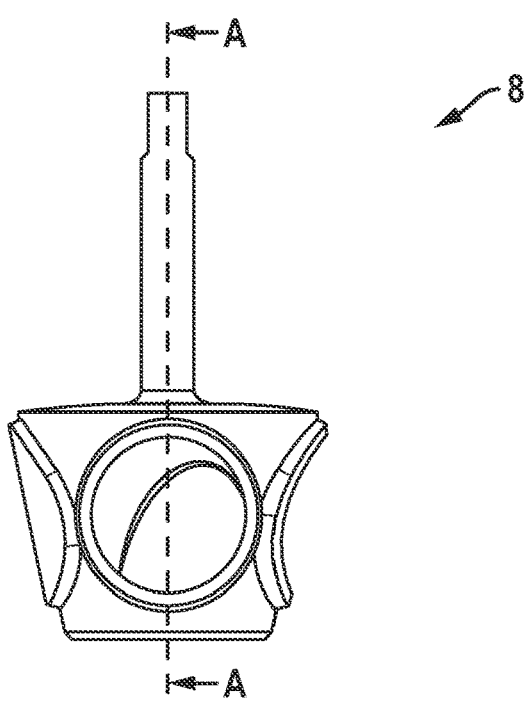
Figure 11D:
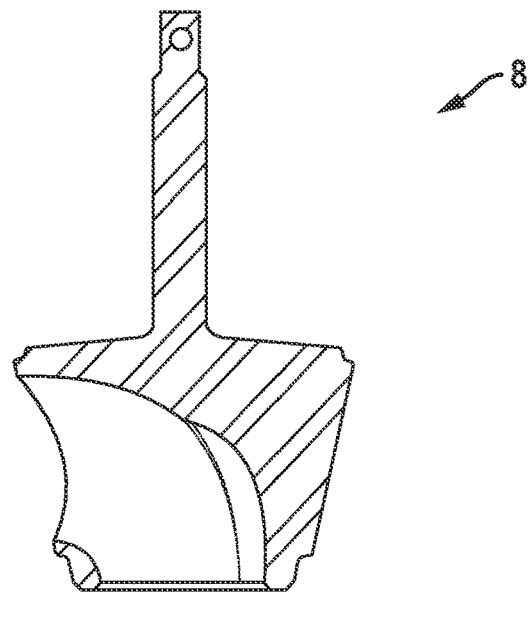
Figure 11H:
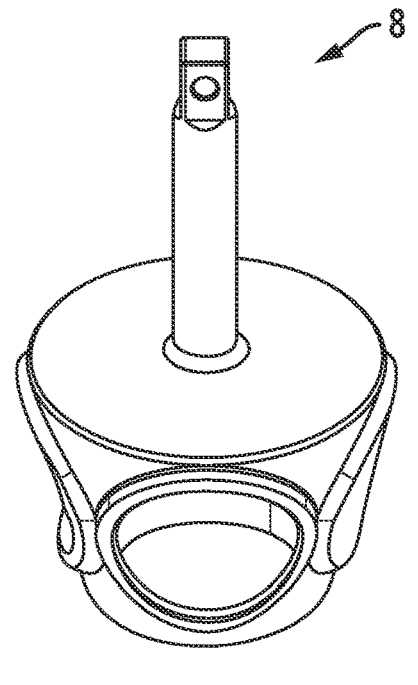
Figure 11I:
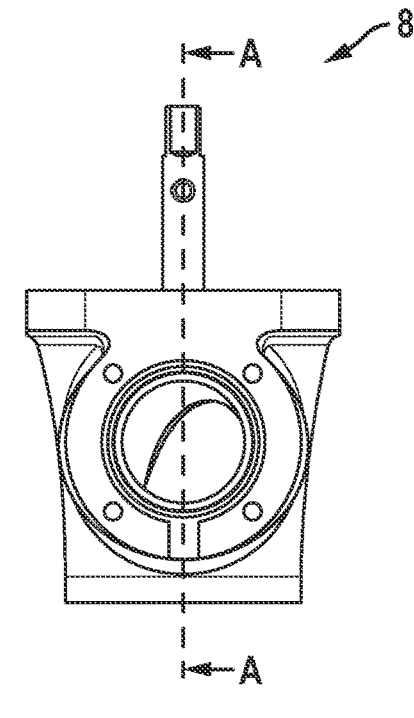
Figure 11J:
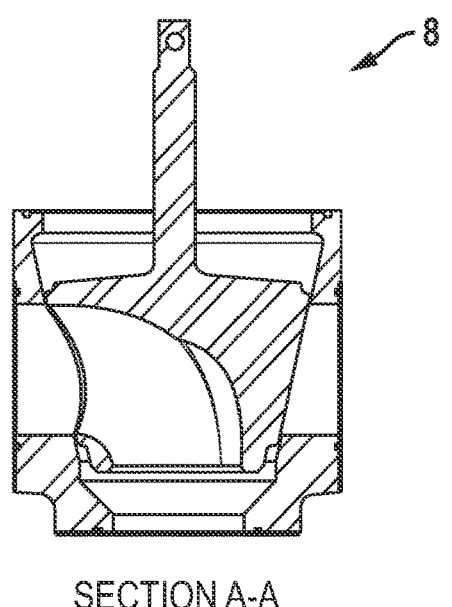
Figure 11N:
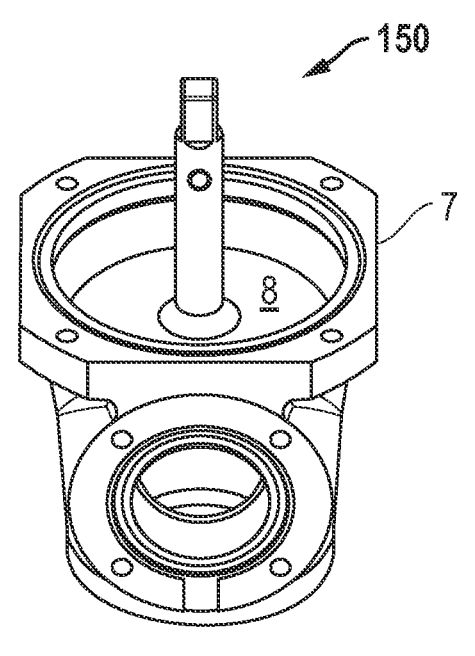
Figure 11O:
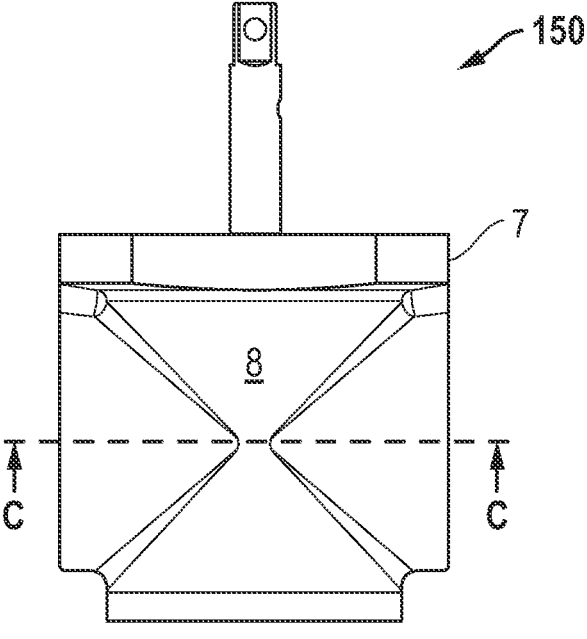
Figure 11P:
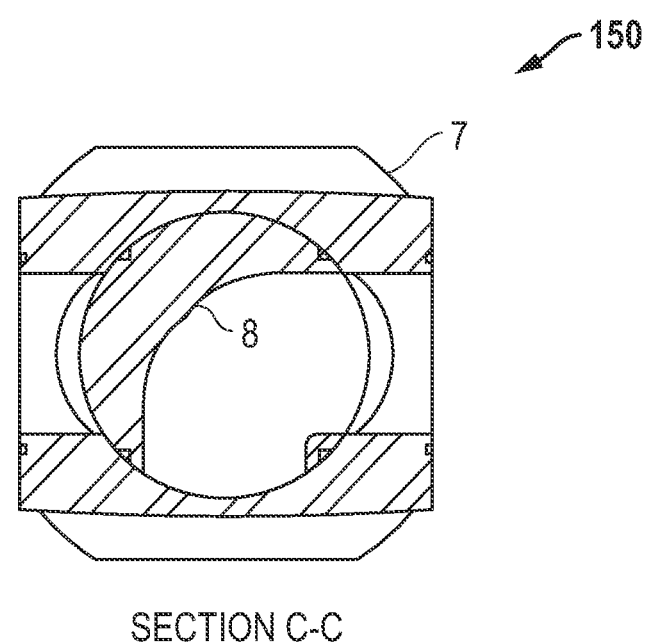

FIGS. 11A-11P show various aspects of a sanitary valve 150, which is designed to function like the sanitary valve 100, but in the sanitary valve 150, the cleaning features are incorporated primarily in the plug 8 rather than the body 7, to increase reliability and to reduce manufacturing costs. FIG. 11A shows an orthogonal view of the body 7 of the sanitary valve 150 with two lateral body openings and a bottom body opening. FIG. 11B shows a cross-section of the body 7 of the sanitary valve 150.

FIG. 11C shows a side view of the plug 8 of the sanitary valve 150, shown here with two lateral plug openings and a bottom plug opening in fluid communication with each other. FIG. 11D shows a cross-sectional view of the plug 8 of the sanitary valve 150 at A-A as indicated in FIG. 11C.

FIG. 11E shows an orthogonal view of the plug 8 of the sanitary valve 150. FIG. 11F shows a side view of the plug 8. FIGS. 11E and 11F show, in addition to the sloping top surface 602 and the sloping lateral surface 604 of plug 8, a cleaning feature, a drainage channel 1102a between the two lateral openings 805a and 805b, to allow fluid to flow from above the plug 8 in its seated position to the bottom body opening (not shown) as opposed to being trapped in the sanitary valve 150. FIG. 11G shows a cross-sectional view of the plug 8 at B-B as indicated in FIG. 11F.

FIG. 11H shows the plug 8 of the sanitary valve 150. FIG. 11I shows a side view of the plug 8. FIG. 11J shows a cross-section of the plug 8 at A-A as indicated in FIG. 11I.

FIG. 11K shows a top view of the sanitary valve 150 with with the plug 8 seated in the body 7 of the sanitary valve 150. FIG. 11K also shows cleaning features, drainage channels 1102a, 1102b, 1102c, and 1102d on the lateral surface 604 of plug 8. FIG. 11L shows a side view of the sanitary valve 150 with the plug 8 seated in the body 7. FIG. 11M shows a cross-section of the sanitary valve 150 at B-B as indicated in FIG. 11L. FIG. 11M also shows drainage channels 1102b and 1102d.

FIG. 11N shows an orthogonal view of the sanitary valve 150 with the plug 8 seated in the body 7. FIG. 11O shows another side view of the sanitary valve 150 with the plug 8 seated in the body 7. FIG. 11P shows a cross-section of the sanitary valve 150 at C-C as indicated in FIG. 11O.

FIGS. 12A-12C, and 13A-13B show various aspects of a two-port bi-directional shut-off sanitary valve 200. In the two-port bi-directional horizontal shut-off sanitary valve 200, the body 7 has two lateral body openings, and the plug 8 has two lateral body openings in fluid communication with each other. Neither the body 7 nor the plug 8 have bottom openings. "Horizontal" with respect to the bi-directional horizontal shut-off sanitary valve 200 refers to the orientation of fluid flow in the system of which the sanitary valve 200 is a component.

Figure 12C:
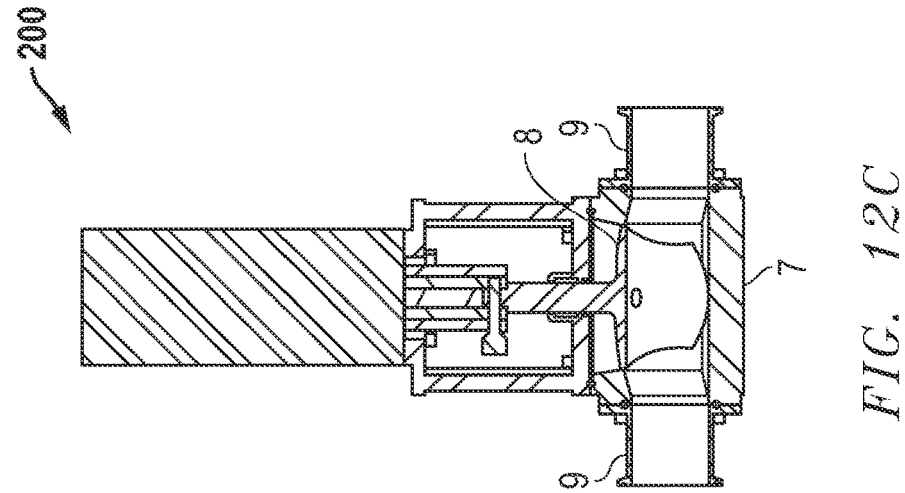
FIGS. 12A-12C show three views of a two-port bi-directional horizontal shut-off sanitary valve.
Figure 12B:
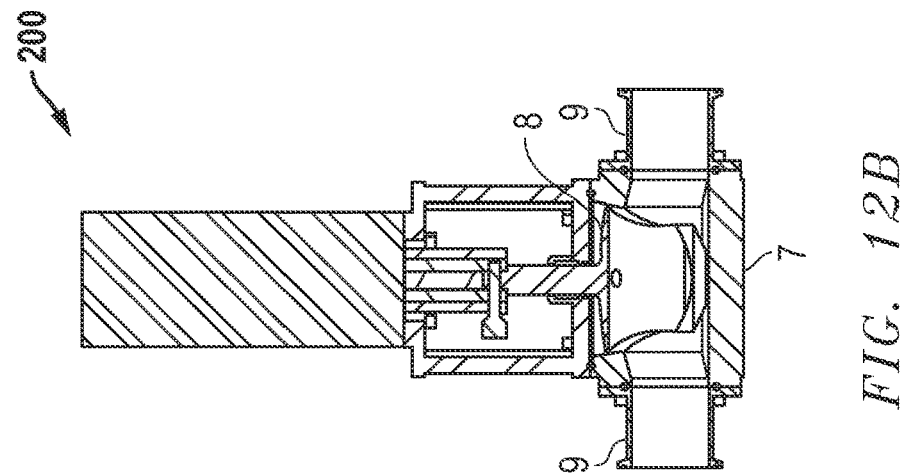
Figure 12A:
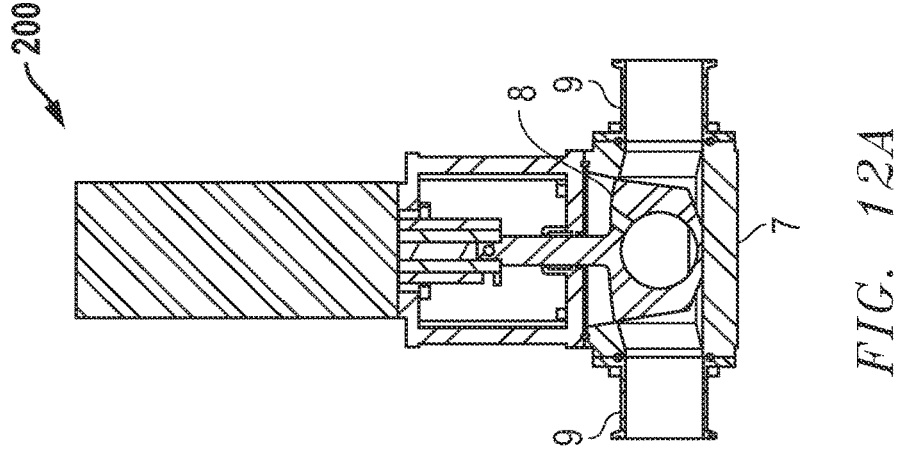

FIGS. 12A-12C show three views of the two-port bi-directional horizontal shut-off sanitary valve 200. The sanitary valve 200 has all of the same components as the sanitary valve 100 except that the sanitary valve 200 has only two connections 9 instead of three, and the plug 8 has two lateral openings directly opposite each other instead of at angles to each other. FIG. 12A shows the plug 8 of the sanitary valve 200 in a closed position. FIG. 12B shows the plug 8 in its lifted position and rotated from the closed position to an open position. FIG. 12C shows the plug 8 in its seated position and in the open position.

Figure 13A:
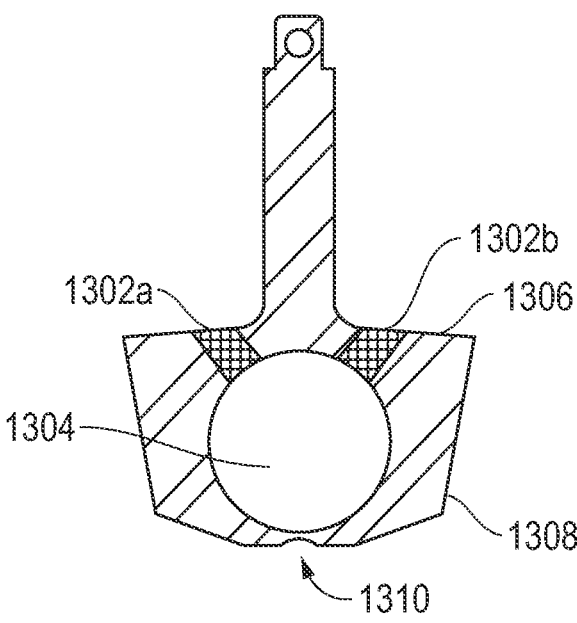
FIG. 13A shows a cross-section of the plug of the bi-directional horizontal shut-off sanitary valve.
Figure 13B:
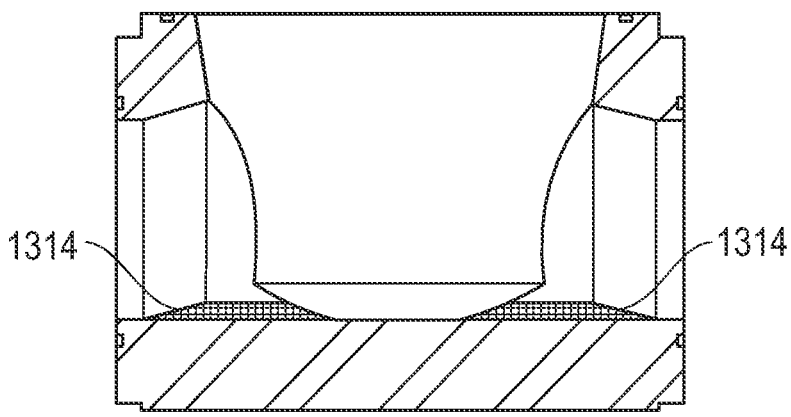
FIG. 13B shows the sloping surface inside the body of the bi-directional horizontal shut-off sanitary valve.

FIG. 13A shows a cross-section of the plug 8 of the sanitary valve 200. The plug 8 has several sloping features to facilitate drainage and CIP: sloped drain ports 1302a and 1302b placing the top plug surface 1306 and the plug interior 1304 in fluid communication; a sloping top plug surface 1306; a sloping lateral plug surface 1308, and a slot 1310 in the bottom of the plug 8. FIG. 13B shows the sloping surface 1314 inside the body 7, which also facilitates drainage and CIP.

Like the sanitary valve 100, the sanitary valve 200 can be cleaned in place. The plug 8 of the sanitary valve 200 may be lifted along the vertical axis 12, typically about 5 mm from its seated position, by the actuator 1. When the plug 8 is in this position, all valve surfaces that come into contact with the fluid being handled, that is, wetted surfaces, are exposed within the sanitary valve 200 so that a cleaning solution can be applied to clean those surfaces without removing the sanitary valve 200 or disassembling it.

FIGS. 14A-14I show various aspects of a uni-directional horizontal shut-off sanitary valve 250. In the uni-directional horizontal shut-off sanitary valve 250, the body 7 has two lateral body openings, and the plug 8 has two lateral body openings in fluid communication with each other. Neither the body 7 nor the plug 8 have bottom openings. "Horizontal" with respect to the uni-directional horizontal shut-off sanitary valve 250 refers to the orientation of fluid flow in the system of which the sanitary valve 250 is a component.

Figures 14A, 14B, 14C:
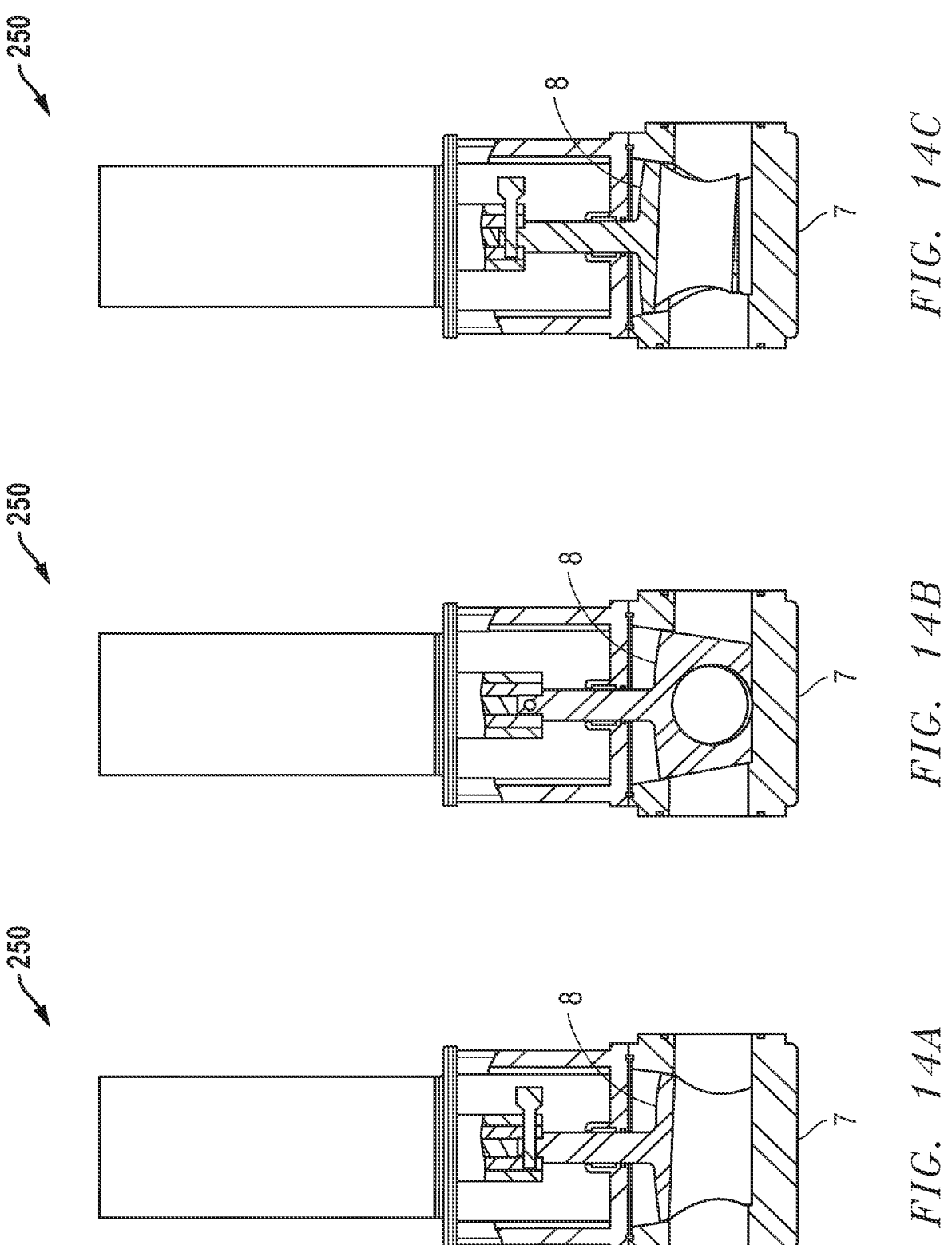
FIGS. 14A-14C show three views of a two-port uni-directional horizontal shut-off sanitary valve.

FIGS. 14A-14C show three views of the two-port uni-directional horizontal shut-off sanitary valve 250. The sanitary valve 250 has all of the same components as the sanitary valve 100 except that the sanitary valve 250 has only two connections 9 (not shown) instead of three, and the plug 8 has two lateral openings directly opposite each other instead of at angles to each other. Also shown is the body 7. FIG. 14A shows the plug 8 of the sanitary valve 250 in an open position. FIG. 14B shows the plug 8 in its seated position and in the closed position. FIG. 14C shows the plug 8 in its lifted position and rotated from the closed position to an open position.

FIGS. 14D and 14E show a side view and a cross-sectional view of the plug 8, respectively, showing features of the plug 8 that allow proper drainage of the sanitary valve 250 and facilitate cleaning in place. The top plug surface 1402 is sloped outward and downward and the lateral plug surface 1404 is sloped downward and inward to facilitate the flow of fluid to the bottom of the plug. The cross-section shown in FIG. 14E is at the line A-A in FIG. 14D. FIG. 14F shows a perspective view of the plug 8 with top plug surface 1402 and lateral plug surface 1404.

Figure 14G:
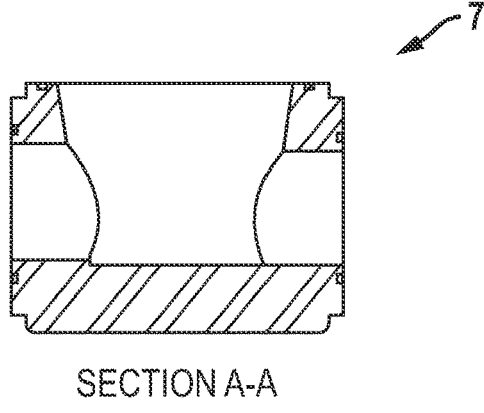
FIGS. 14G-14I show the sloping surface inside the body of the uni-directional horizontal shut-off sanitary valve.
Figure 14H:
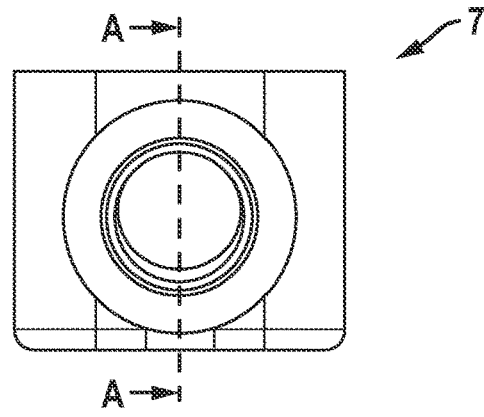
Figure 14I:
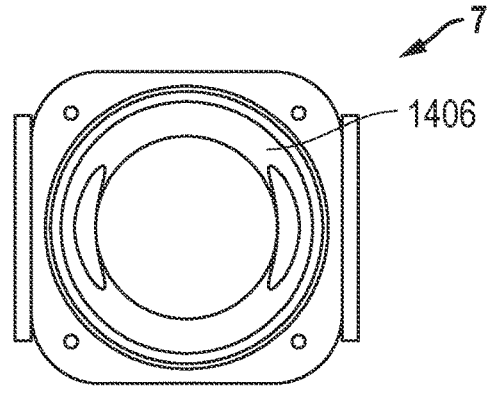

FIGS. 14G-14I show three additional views of the the two-port uni-directional horizontal shut-off sanitary valve 250. FIG. 14G shows a side view of the body 7 of the sanitary valve 250 with the plug 8 seated within it. FIG. 14H shows a cross-sectional view of the body 7 taken at line A-A of FIG. 14G. FIG. 14I shows a top of of the body 7 of the sanitary valve 250 without the plug present. FIG. 14I shows the sloped interior surface 1406 of the body 7.

Like the sanitary valve 100, the sanitary valve 250 can be cleaned in place. The plug 8 of the sanitary valve 250 may be lifted along the vertical axis 12, typically about 5 mm from its seated position, by the actuator 1. When the plug 8 is in this position, all valve surfaces that come into contact with the fluid being handled, that is, wetted surfaces, are exposed within the sanitary valve 250 so that a cleaning solution can be applied to clean those surfaces without removing the sanitary valve 250 or disassembling it.

FIGS. 15A-15C and 16A-16B show various aspects of a two-port vertical shut-off sanitary valve 300. In FIGS. 15A-15C and 16A-16B, the tops of the body 7 and of the plug 8 are to the left, and the bottoms are to the right. In the two-port vertical shut-off sanitary valve 300, the body 7 has two lateral body openings, and the plug 8 has two lateral body openings and in fluid communication. Neither the body 7 nor the plug 8 have bottom openings. "Vertical" with respect to the vertical shut-off sanitary valve 300 refers to the orientation of fluid flow in the system of which the sanitary valve 300 is a component, but the vertical axis 12 of the sanitary valve 300 is oriented in this case at a large angle to the vertical fluid flow.

FIGS. 15A-15C show three views of a two-port vertical shut-off sanitary valve 300, with body 7, plug 8, and vertical axis 12. The sanitary valve 300 has all of the same components as the sanitary valve 100 except that the sanitary valve 300 has only two lateral openings instead of three, and the plug 8 has two lateral openings directly opposite each other instead of at right angles to each other. FIG. 15A shows the plug 8 of sanitary valve 300 in a closed position and seated. FIG. 15B shows the plug 8 in a lifted, open position. FIG. 15C shows the plug 8 in a seated, open position.

FIG. 16A shows a cross-section of the body 7 of the two-port vertical shut-off sanitary valve 300. The body 7 has sloped surfaces 1602a and 1602b to facilitate drainage and CIP. FIG. 16B shows a cross-section of the plug 8 of the sanitary valve 300, with sloping drain ports 1604a and 1604b placing the top plug surface 1606 and the plug interior 1608 in fluid communication to facilitate drainage and CIP. The sloping lateral surface 1610 is also shown.

Like the sanitary valves 100, 200, and 250, the sanitary valve 300 can be cleaned in place. The plug 8 of the sanitary valve 300 may be lifted along the vertical axis 12, typically about 5 mm from its seated position, by the actuator 1. When the plug 8 is in this position, all valve surfaces that come into contact with the fluid being handled, that is, wetted surfaces, are exposed within the sanitary valve 300 so that a cleaning solution can be applied to clean those surfaces without removing the sanitary valve 300 or disassembling it.

FIGS. 17, 18, 19A-19B show various typical uses of the present invention. FIG. 17 shows a typical tank discharge application of a sanitary valve. FIG. 18 shows a typical cluster application of a sanitary valve. FIGS. 19A and 19B show a common cheese vat double block and bleed (mix-proof) arrangement.

In FIG. 17, a product tank 1702, a centrifugal supply pump 1704, an outlet valve 1706, and in-line divert valve 1708 are shown. FIG. 17 shows two valves functioning in concert with the supply pump 1704. The outlet valve 1706 is acting as a tank outlet valve. Valve 1706 would need to be a normally closed to protect against leakage during a power outage. Valve 1708 is a divert valve connected to the discharge of the pump and is designed to send the tank contents to multiple destinations within the plant.

In FIG. 18, product tanks 1802, transfer pumps 1804, tank outlet valves 1806, and a divert valve manifold 1808 are shown. This manifold 1808 allows product from the product tanks 1802 to move product from one of these tanks to any one of the transfer pumps 1804. The tank outlet valves 1806 are stop valves that keep product in the product tanks 1802 until needed. This application is common where any one tank 1802 could supply any transfer pump 1804 to send pasteurized product to a filler, for example.

FIGS. 19A and 19B show a common cheese vat double block and bleed (mix-proof) arrangement. In FIG. 19A, cheese vats 1902a and 1902b, curd product line 1904, mix-proof outlet valves 1906a and 1906b, CIP returns 1908a and 1908b, and block and bleed (mix-proof) discharge valves 1910a and 1910b are shown. The Pasteurized Milk Ordinance requires that conflicting products always have two seats of separation. FIGS. 19A and 19B depict a valving arrangement that allows the cleaning of one cheese vat 1902*a* while cleaning of the other cheese vat 1902*b*, with FIG. 19B showing for cheese vat 1902*a*, curd product line 1904, mix-proof outlet valve 1906*a*, CIP return 1908*a*, and block and bleed (mix-proof) discharge valve 1910*a*. In this example, the cheese vat 1902*a*, which is discharging curd, would open valve 1906*a*, close CIP return 1908*a*, and open valve 1910*a*. This would send product downstream through the curd product line 1904. At the same time the cheese vat 1902*b* would open valve 1906*b*, open CIP return 1908*b*, and close valve 1910*b* and run CIP through the cheese vat 1902*b* for cleaning. With this configuration, two seats of separation are always maintained.

The sanitary valves 100, 150, 200, 250, or 300 may be included in a sanitary valve kit that also includes other items generally associated with the installation or maintenance of valves, including but not limited to standard connectors, bolts, and one or more cleaning implements.

One skilled in the art will recognize that the sanitary valves 100, 150, 200, 250, and 300 are valves that can be thoroughly cleaned while installed in a system for handling fluids, without removal or disassembly.

A sanitary valve according to the invention consists of, consists essentially of, or comprises a body comprising at least two body openings; a plug disposed within the body, rotatable around a vertical axis, moveable along the vertical axis within the body, and comprising a plug top surface and at least two plug openings in fluid communication; a stem comprising a first stem end attached to the top plug surface and a second stem end; and an actuator attached to the second stem end and operable to rotate the stem and the plug around the vertical axis and to move the stem and the plug along the vertical axis.

A sanitary valve kit according to the invention consists of, consists essentially of, or comprises a sanitary valve comprising: a body comprising at least two body openings; a plug disposed within the body, rotatable around a vertical axis, moveable along the vertical axis within the body, and comprising a plug top surface and at least two plug openings in fluid communication; a stem comprising a first stem end attached to the top plug surface and a second stem end; and an actuator attached to the second stem end and operable to rotate the stem and the plug around the vertical axis and to move the stem and the plug along the vertical axis.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example,"A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A sanitary valve comprising:
   a body comprising a body top, a body bottom, and at least two body openings, wherein the body top is a side of the body toward a stem of a plug and the body bottom is a side of the body away from the stem of the plug;
   the plug, disposed wholly within the body, rotatable around a vertical axis, moveable along the vertical axis within the body, and comprising at least two plug openings in fluid communication, wherein the plug comprises a top plug surface and a lateral plug surface that slopes downward and inward, to reduce trapping fluid or to facilitate a flow of fluid to a bottom plug surface of the plug, wherein the top plug surface is a side of the plug toward the stem, and wherein the bottom plug surface is a side of the plug away from the stem;
   the stem, disposed along the vertical axis, comprising a first stem end attached to the top plug surface and a second stem end; and
   an actuator attached to the second stem end and operable to rotate the stem and the plug around the vertical axis and to move the stem and the plug vertically along the vertical axis;
   wherein one of the at least two body openings is a bottom body opening in the body bottom and one of the at least two plug openings is a bottom plug opening;
   wherein the top plug surface slopes outward and downward from the stem to an outermost circumference of the plug to reduce trapping fluid or to facilitate a flow of fluid to the bottom of the plug; and
   wherein an inner lateral surface of the body comprises one or more vertical linear drainage channels that are not in fluid communication with a lateral body opening, when the plug is in a seated position and the at least two plug openings are in full communication with the at least two body openings, to reduce trapping fluid or to facilitate cleaning of the sanitary valve, wherein the one or more drainage channels extend above and below the plug when the plug is seated in the body, wherein the inner lateral surface of the body is between the body top and the body bottom.

2. The sanitary valve of claim 1, wherein one of the at least two body openings is a lateral body opening and one of the at least two plug openings is a lateral plug opening.

3. The sanitary valve of claim 1, wherein an interior wall of the body comprises the one or more drainage channels or a sloping segment proximate to the bottom body opening, or both, to reduce trapping fluid or to facilitate cleaning of the sanitary valve.

4. The sanitary valve of claim 1, wherein the sanitary valve is configured to be cleaned without removal from a system of which the sanitary valve is a component.

5. The sanitary valve of claim 1, wherein the sanitary valve is configured to be cleaned without disassembly.

6. The sanitary valve of claim 1, wherein the sanitary valve is configured to be cleaned when the plug is disposed upward along the vertical axis from the seated position within an interior of the body.

7. The sanitary valve of claim 1, wherein at least a portion of the plug or a portion of an interior of the body, or both, is coated with one or more materials that facilitate reducing trapping of fluids, or cleaning, or both.

8. The sanitary valve of claim 1, wherein the body comprises steel, stainless steel, any compatible metal, plastic, polymer, plastic-polymer composite, plastic-metal composite, polymer-metal composite, plastic-coated metal, polymer-coated metal, or some combination thereof.

9. The sanitary valve of claim 1, wherein the plug comprises steel, stainless steel, any compatible metal, plastic, polymer, plastic-polymer composite, plastic-metal composite, polymer-metal composite, plastic-coated metal, polymer-coated metal, or some combination thereof.

10. A sanitary valve kit comprising:
    a sanitary valve comprising:
    a body comprising at least two body openings;
    a plug disposed wholly within the body, rotatable around a vertical axis, moveable along the vertical axis within the body, and comprising at least two plug openings in fluid communication, wherein the plug comprises a top plug surface and a lateral plug surface that slopes downward and inward, to reduce trapping fluid or to facilitate a flow of fluid to a bottom of the plug;
    a stem comprising a first stem end attached to the top plug surface and a second stem end; and
    an actuator attached to the second stem end and operable to rotate the stem and the plug around the vertical axis and to move the stem and the plug vertically along the vertical axis;
    wherein one of the at least two body openings is a bottom body opening in a bottom-most surface of the body and one of the at least two plug openings is a bottom plug opening;
    wherein the top plug surface slopes outward and downward from the stem to an outermost circumference of the plug to reduce trapping fluid or to facilitate a flow of fluid to the bottom of the plug; and
    wherein an inner surface of the body comprises one or more vertical linear drainage channels that are not in fluid communication with a lateral body opening, when the plug is in a seated position and the at least two plug openings are in full communication with the at least two body openings, to reduce trapping fluid or to facilitate cleaning of the sanitary valve, wherein the one or more drainage channels extend above and below the plug when the plug is seated in the body;
    wherein the top plug surface, the lateral plug surface, the bottom of the plug, the bottom body opening, the bottom-most surface of the body, the two plug openings, the vertical linear drainage channels, and the lateral body opening are so oriented when the vertical axis is oriented vertically.

11. The sanitary valve kit of claim 10, wherein one of the at least two body openings is a lateral body opening and one of the at least two plug openings is a lateral plug opening.

12. The sanitary valve kit of claim 10, wherein an interior wall of the body comprises the one or more drainage channels or a sloping segment proximate to the bottom body opening, or both, to reduce trapping fluid or to facilitate cleaning of the sanitary valve.

13. The sanitary valve kit of claim 10, wherein the sanitary valve is configured to be cleaned without removal from a system of which the sanitary valve is a component.

14. The sanitary valve kit of claim 10, wherein the sanitary valve is configured to be cleaned without disassembly.

15. The sanitary valve kit of claim 10, wherein the sanitary valve is configured to be cleaned when the plug is disposed upward along the vertical axis from the seated position within an interior of the body.

16. The sanitary valve kit of claim 10, wherein at least a portion of the plug or a portion of an interior of the body, or both, is coated with one or more materials that facilitate reducing trapping of fluids or cleaning or both.

17. The sanitary valve kit of claim 10, wherein the body comprises steel, stainless steel, any compatible metal, plastic, polymer, plastic-polymer composite, plastic-metal composite, polymer-metal composite, plastic-coated metal, polymer-coated metal, or some combination thereof.

18. The sanitary valve kit of claim 10, wherein the plug comprises steel, stainless steel, any compatible metal, plastic, polymer, plastic-polymer composite, plastic-metal composite, polymer-metal composite, plastic-coated metal, polymer-coated metal, or some combination thereof.

\* \* \* \* \*